(12) United States Patent
Kashiwagi et al.

(10) Patent No.: US 9,194,719 B2
(45) Date of Patent: Nov. 24, 2015

(54) INFORMATION PROCESSING APPARATUS, INFORMATION PROCESSING METHOD, AND PROGRAM FOR CONTROLLING PRESENTATION OF ENERGY CONSUMPTION

(75) Inventors: Akifumi Kashiwagi, Tokyo (JP);
Norifumi Kikkawa, Tokyo (JP);
Kayoko Tanaka, Tokyo (JP)

(73) Assignee: Sony Corporation, Tokyo (JP)

(*) Notice: Subject to any disclaimer, the term of this patent is extended or adjusted under 35 U.S.C. 154(b) by 152 days.

(21) Appl. No.: 13/458,039

(22) Filed: Apr. 27, 2012

(65) Prior Publication Data

US 2012/0306882 A1    Dec. 6, 2012

(30) Foreign Application Priority Data

Jun. 5, 2011    (JP) .................................. 2011-103480

(51) Int. Cl.
| | |
|---|---|
| G06T 11/20 | (2006.01) |
| G01D 4/00 | (2006.01) |
| G05B 15/02 | (2006.01) |
| H04L 12/28 | (2006.01) |

(52) U.S. Cl.
CPC ........ *G01D 4/00* (2013.01); *G05B 15/02* (2013.01); *H04L 12/282* (2013.01); *Y02B 70/343* (2013.01); *Y02B 90/24* (2013.01); *Y02B 90/245* (2013.01); *Y04S 20/34* (2013.01); *Y04S 20/40* (2013.01)

(58) Field of Classification Search
USPC .................... 345/440; 702/182–186; 700/291
See application file for complete search history.

(56) References Cited

U.S. PATENT DOCUMENTS

| | | | |
|---|---|---|---|
| 2003/0061091 A1* | 3/2003 | Amaratunga et al. | ........... 705/10 |
| 2007/0129850 A1* | 6/2007 | Miyaji | .......................... 700/276 |
| 2010/0187219 A1* | 7/2010 | Besore et al. | .................. 219/494 |
| 2010/0211509 A1* | 8/2010 | Jacobs | .......................... 705/302 |
| 2010/0289643 A1* | 11/2010 | Trundle et al. | ............. 340/545.1 |
| 2011/0016336 A1* | 1/2011 | Mori et al. | ..................... 713/320 |
| 2011/0022242 A1 | 1/2011 | Bukhin et al. | |
| 2011/0046792 A1 | 2/2011 | Imes et al. | |
| 2011/0072378 A1* | 3/2011 | Nurminen et al. | ............. 715/771 |
| 2011/0214000 A1* | 9/2011 | Naccache et al. | ............. 713/330 |
| 2011/0276527 A1* | 11/2011 | Pitcher et al. | .................... 706/21 |

(Continued)

FOREIGN PATENT DOCUMENTS

| | | |
|---|---|---|
| JP | 2001-056804 | 2/2001 |
| JP | 2001-101292 | 4/2001 |

(Continued)

OTHER PUBLICATIONS

European Search Report for related EP Patent Application No. EP 12 16 4942 dated Nov. 5, 2012.

(Continued)

*Primary Examiner* — Stephen R Koziol
*Assistant Examiner* — Terrell Robinson
(74) *Attorney, Agent, or Firm* — Paratus Law Group, PLLC

(57) ABSTRACT

There is provided an information processing apparatus including a control section which performs control of presenting, in association with each other, actual energy consumption representing an amount of energy consumed by a device in a case where a user performs any one of user actions, the user actions each being capable of being carried out by the user, and estimated energy consumption representing an amount of energy consumed by the device in a case where the user does not perform the user action.

8 Claims, 25 Drawing Sheets

(56) References Cited

U.S. PATENT DOCUMENTS

2011/0289019 A1* 11/2011 Radloff et al. ............. 705/412
2012/0035777 A1* 2/2012 Park .......................... 700/291

FOREIGN PATENT DOCUMENTS

| JP | 2002-259508 | 9/2002 | | |
|---|---|---|---|---|
| JP | 2003-256505 | 9/2003 | | |
| JP | 2003-256506 | 9/2003 | | |
| JP | 2006-285343 | 10/2006 | | |
| JP | 2007-164754 | 6/2007 | | |
| JP | 2008-102709 | 5/2008 | | |
| JP | 2010-146387 | 7/2010 | | |
| JP | 2010-175388 | 8/2010 | | |
| JP | 2010-237774 | 10/2010 | | |
| JP | 2011-034484 | 2/2011 | | |
| WO | WO2010057827 | * | 11/2009 | ............. D06F 39/00 |

OTHER PUBLICATIONS

Dec. 24, 2014, Japanese Office Action for related JP application No. 2011-103480.

May 26, 2015, EP communication issued for related EP application No. 15154961.5.

* cited by examiner

FIG. 19

Rerorts

- REPORT ACTION ITEM ID
- REPORT DATE
- DEGREE OF ACHIEVEMENT
- ACTION LOCATION
- START TIME
- END TIME
- INDIVIDUAL ESTIMATED POWER CONSUMPTION GRAPH
- KEY TO Users
- KEY TO EcoActions
- KEY TO EvaluationValues

FIG. 20

EcoActions

- ECOLOGICAL ACTION ITEM ID
- ECOLOGICAL ACTION NAME
- KEY TO ProfileCategories_has_EcoActions
- KEY TO Devices_has_EcoActions

FIG. 21

UserProfiles

- USER PROFILE-SET VALUE ID
- KEY TO Users
- KEY TO ProfileCategories

FIG. 27

| ECOLOGICAL ACTION | MAXIMUM | | | MINIMUM | | | AVERAGE | | |
|---|---|---|---|---|---|---|---|---|---|
| | START TIME | END TIME | REDUCTION | START TIME | END TIME | REDUCTION | START TIME | END TIME | REDUCTION |
| OPENING CURTAIN | 9:20 | 18:30 | | 4:00 | 24:00 | | 6:00 | 19:00 | |
| CLOSING CURTAIN | 18:30 | 9:20 | | 24:00 | (NEXT DAY) 4:00 | | 19:00 | 6:20 | |
| TURNING OFF ALL LIGHTING | 21:00 | 8:00 | | 24:00 | (NEXT DAY) 6:00 | | 23:30 | (NEXT DAY) 7:00 | |
| ... | ... | ... | ... | ... | ... | ... | ... | ... | ... |

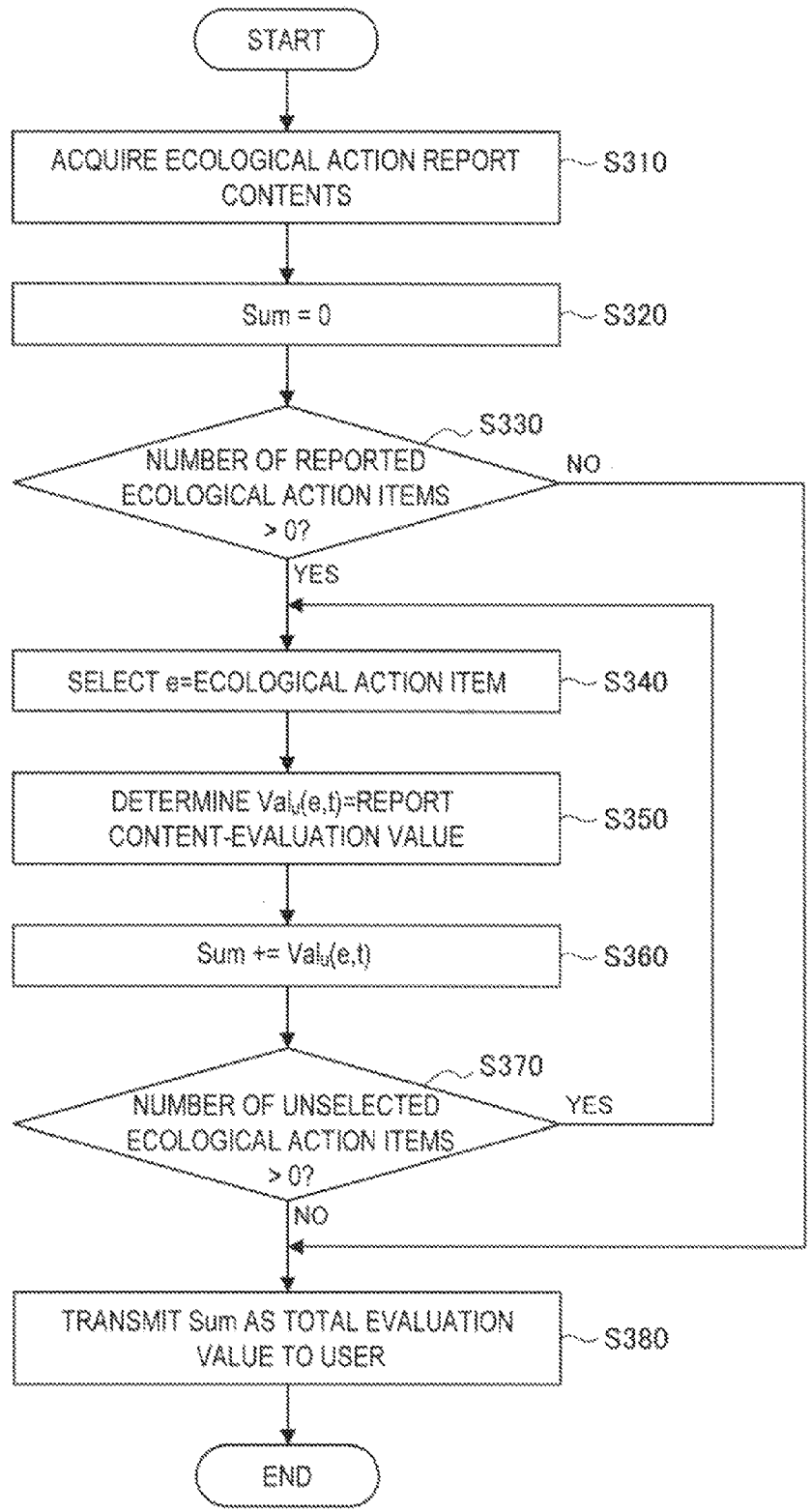

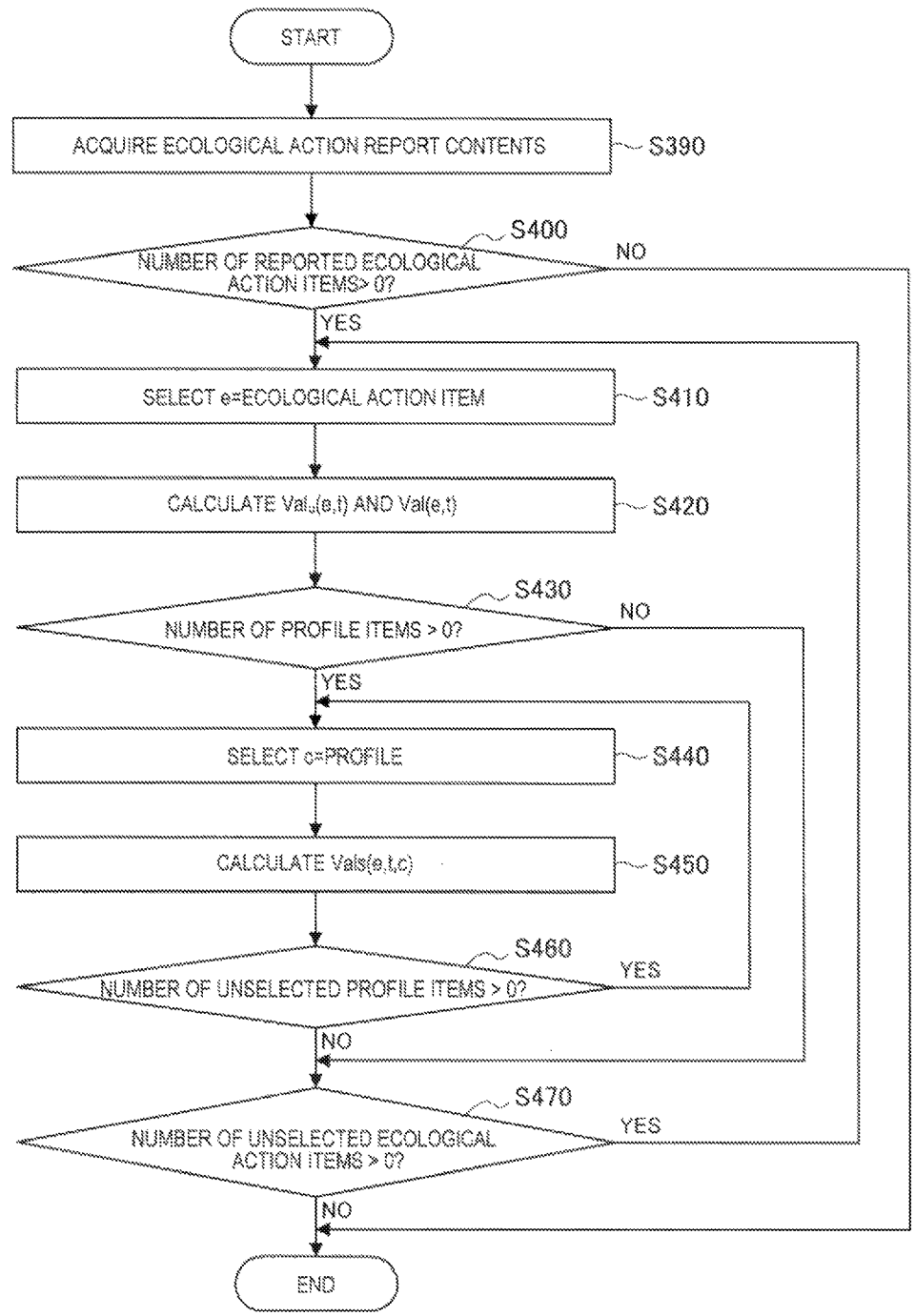

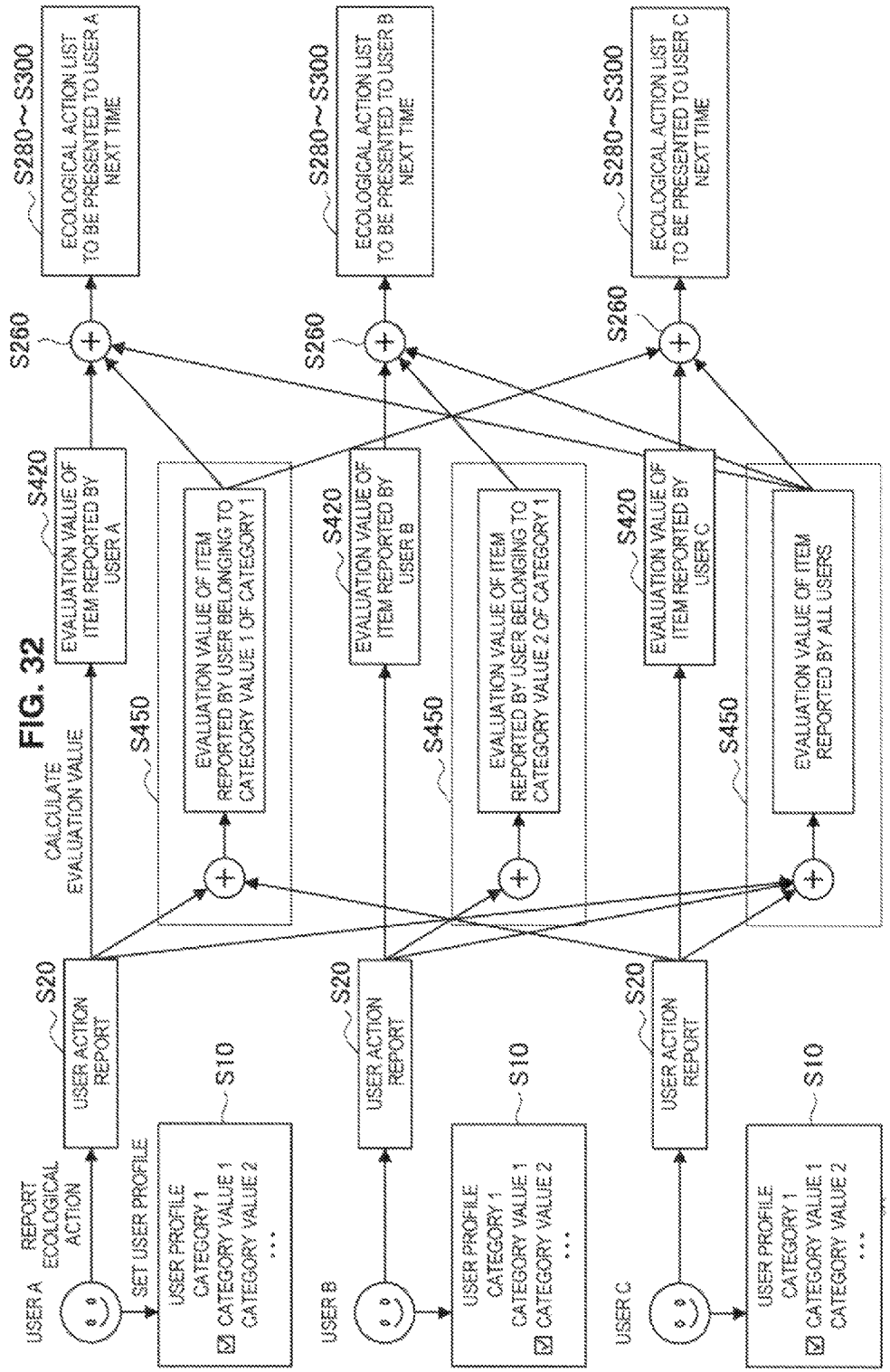

INFORMATION PROCESSING APPARATUS, INFORMATION PROCESSING METHOD, AND PROGRAM FOR CONTROLLING PRESENTATION OF ENERGY CONSUMPTION

BACKGROUND

The present disclosure relates to an information processing apparatus, an information processing method, and a program.

For example, as described in JP 2010-175388A, technology is known for promoting an ecological action by notifying a user of electric power consumed in a household by "visualization". Here, the "visualization" means to display the power consumption in a numerical value or a graph on a display.

SUMMARY

However, since the technology described in JP 2010-175388A only displays power consumption of each electric product, it is difficult for the user to determine whether or not each user action has ecological effects. In light of the foregoing, it is desirable to provide technology capable of allowing the user to easily determine whether each user action has ecological effects.

According to an embodiment of the present disclosure, there is provided an information processing apparatus which includes a control section which performs control of presenting, in association with each other, actual energy consumption representing an amount of energy consumed by a device in a case where a user performs any one of user actions, the user actions each being capable of being carried out by the user, and estimated energy consumption representing an amount of energy consumed by the device in a case where the user does not perform the user action.

According to another embodiment of the present disclosure, there is provided an information processing method which includes performing control of presenting, in association with each other, actual energy consumption representing an amount of energy consumed by a device in a case where a user performs any one of user actions, the user actions each being capable of being carried out by the user, and estimated energy consumption representing an amount of energy consumed by the device in a case where the user does not perform the user action.

According to another embodiment of the present disclosure, there is provided a program for causing a computer to realize a control function for performing control of presenting, in association with each other, actual energy consumption representing an amount of energy consumed by a device in a case where a user performs any one of user actions, the user actions each being capable of being carried out by the user, and estimated energy consumption representing an amount of energy consumed by the device in a case where the user does not perform the user action.

According to the embodiments of the present disclosure, the information processing apparatus is capable of presenting the actual energy consumption and the estimated energy consumption in association with each other.

According to the embodiments of the present disclosure described above, since the actual energy consumption and the estimated energy consumption are presented in association with each other, the user can easily determine whether each user action has ecological effects.

BRIEF DESCRIPTION OF THE DRAWINGS

FIG. 19 is an explanatory diagram showing an example of information stored in the storage device;

FIG. 20 is an explanatory diagram showing an example of information stored in the storage device;

FIG. 21 is an explanatory diagram showing an example of information stored in the storage device;

FIG. 27 is an explanatory diagram showing an example of information stored in the storage device;

FIG. 30 is a flowchart showing the procedure of processing performed by the information processing system;

FIG. 31 is a flowchart showing the procedure of processing performed by the information processing system; and FIG. 32 is a flowchart showing the procedure of processing performed by the information processing system.

DETAILED DESCRIPTION OF THE EMBODIMENT(S)

Figure 1:
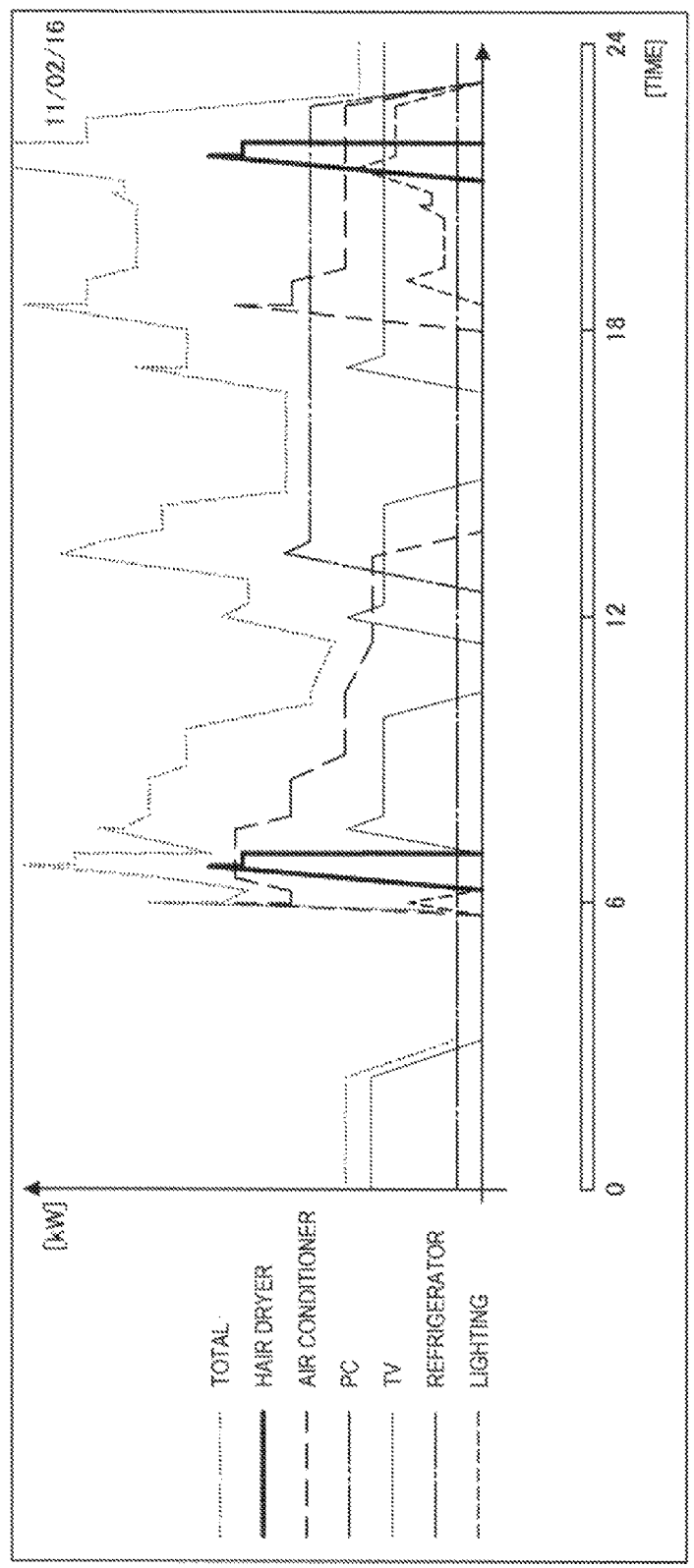
FIG. 1 is an explanatory diagram showing an example of an actual power consumption graph.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.

1. Studies on technology that is assumed to be related to ecological action
2. Configuration of information processing system according to embodiments of the present disclosure
   2-1. Configuration of user device
   2-2. Configuration of storage device
   2-3. Configuration of server
3. Processing Performed by Information Processing System <1. Studies on Technology that is Assumed to be Related to Ecological Action>

The inventors have studied on various types of technology that are assumed to be related to an ecological action, and as a result, have achieved the technology according to the embodiments of the present disclosure. The studies carried out by the inventors will be described. Note that the ecological action represents a user action which is performed in order to obtain an ecological effect (for example, energy-saving effect) among user actions that the user is capable of executing.

FIG. 1 shows an example of an actual power consumption graph. The actual power consumption graph shows a transition of single-day power consumption for each electric product (hereinafter, may be simply referred to as "device"). However, merely with the presentation of the information, it is difficult for the user to determine whether each user action performed in a single day has ecological effects. That is, it is difficult for the user to determine which user action has ecological effects and which user action does not have ecological effects among the user actions performed in a single day. In addition, it is difficult for the user to grasp to what extent of ecological effects the user action having ecological effects, that is, the ecological action, has. Accordingly, it is necessary for the user, while referring to the actual power consumption graph shown in FIG. 1, to imagine an ecological action by himself/herself. In addition, it is necessary for the user to execute the ecological action that the user has come up with, and to check by himself/herself the change of the actual power consumption graph caused by the execution.

However, the above work takes a lot of time and effort. In addition, the ecological action that the user has come up with may not necessarily be continuously practicable and sufficiently effective. For example, it is assumed that the user determines that the power consumption of an air conditioner is high based on the actual power consumption graph shown in FIG. 1, and reduces the use of the air conditioner as an ecological action. In this case, the user endures the heat or coldness in the room, without turning on the power of the air conditioner, and such an ecological action is assumed not to be able to be continuously practicable. Further, the power consumption of the air conditioner is surely reduced by performing such an ecological action, but when coming to think of the possibility that the user will become ill, such an ecological action is assumed to be inefficient in the end.

Note that, since an infinite number of ecological actions are open to the public through the Internet, the user can find an ecological action by using the Internet or the like. However, it also takes time and effort to find out an ecological action that can be continuously carried out by the user. Further, the ecological action found out by the user may not necessarily have sufficient ecological effects.

Further, the user may not take into consideration all user actions performed during a single day. For example, it is assumed that the user considers turning off the main power of a TV as an ecological action, but not particularly takes into consideration the time period in which the user uses a hair dryer. In this case, the reduction of the actual power consumption achieved by turning off the main power of the TV is cancelled out by the use of the hair dryer. Further, there is also assumed a case of forgetting to turn off the TV in nighttime. In those cases, it can be considered that it is difficult to realize a collectively effective ecological action.

Further, there is also assumed a case where, even though the user comes up with an ecological action, it is difficult for the user to feel the significance of the execution of the ecological action. That is, even though the user carries out the ecological action, the ecological effect felt by the user therefrom is only the reduction in monthly electricity charges or the reduction in a value of the actual power consumption graph shown in FIG. 1. Accordingly, it is difficult for the user to actually feel ecological effects, and as a result, it becomes difficult to feel the significance of the execution of the ecological action.

Further, there are devices among recent devices, which automatically act in an ecological way. It is a good thing that the device suppresses the power consumption of itself, but no contribution can be obtained as to cultivate the user's ecological consciousness. As a practical matter, it would be the reverse of the intention if the power consumption increases as a result of the user's dependency on the ecological function of a device and the prolonged usage time of the device. Therefore, this technology has no factor for growing the user's ecological consciousness, and is considered not to be a fundamental improvement strategy for realizing an ecological society.

On the other hand, JP 2008-102709A discloses technology involving presenting a single-day target energy-saving rate to a user. However, even if this technology is used, it is also difficult for the user to determine whether each user action has ecological effects.

Further, JP 2007-164754A discloses technology involving presenting an ecological action and carbon dioxide emission reduction in comparison with each other. However, since this technology does not present anything on user actions not having ecological effects, it is also difficult for the user to determine whether each user action has ecological effects, even by using this technology. In addition, this technology only presents an ecological action based merely on the carbon dioxide emission reduction, and does not take into consideration any conditions that the user is in (for example, preference or lifestyle of the user). Therefore, with the use of this technology, it is difficult to present an ecological action that can be continuously carried out by the user.

Still further, JP 2010-237774A discloses technology involving presenting a difference between single-day actual power consumption and target power consumption to a user. However, even with the use of this technology, it is also difficult for the user to determine whether each user action has ecological effects.

On the other hand, according to an information processing system 10 of the embodiments of the present disclosure, the user can determine whether each user action has ecological effects more easily than in the past. Further, the user can grasp ecological effects of each ecological action more easily than in the past. Still further, the user can grasp an ecological action that can be carried out by the user, in particular, an ecological action that can be continuously carried out by the user, more easily than in the past. Still further, the user can feel the significance of the execution of the ecological action more greatly than in the past. Still further, the user can attempt to improve a user action that the user is not taking into consideration.

<2. Configuration of Information Processing System>

Figure 2:
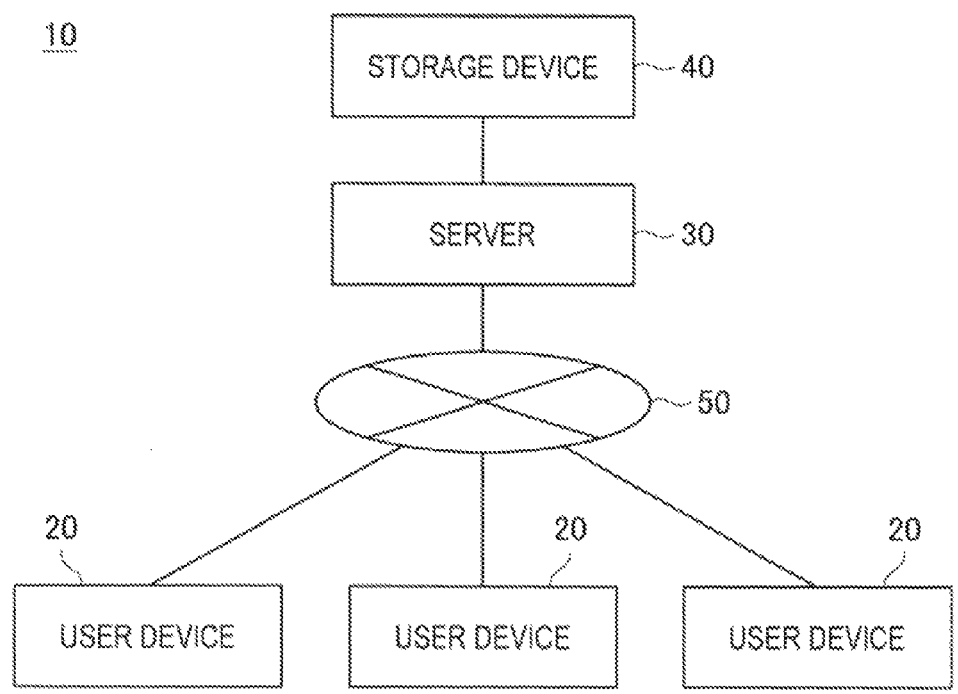
FIG. 2 is a block diagram showing a configuration of an information processing system according to the present embodiment.

Next, based on FIG. 2 and FIG. 3, a configuration of an information processing system 10 will be described. As shown in FIG. 2, the information processing system 10 includes a user device 20, a server 30, a storage device 40, and a network 50. Note that the number of the user devices 20 and the number of the servers 30 are not limited to those shown in FIG. 2. In the description hereafter, "time" represents time of day, "date" represents date/month/year, and "date/time" represents date/month/year and time of day, unless otherwise mentioned.

[2-1. Configuration of User Device]

Figure 3:
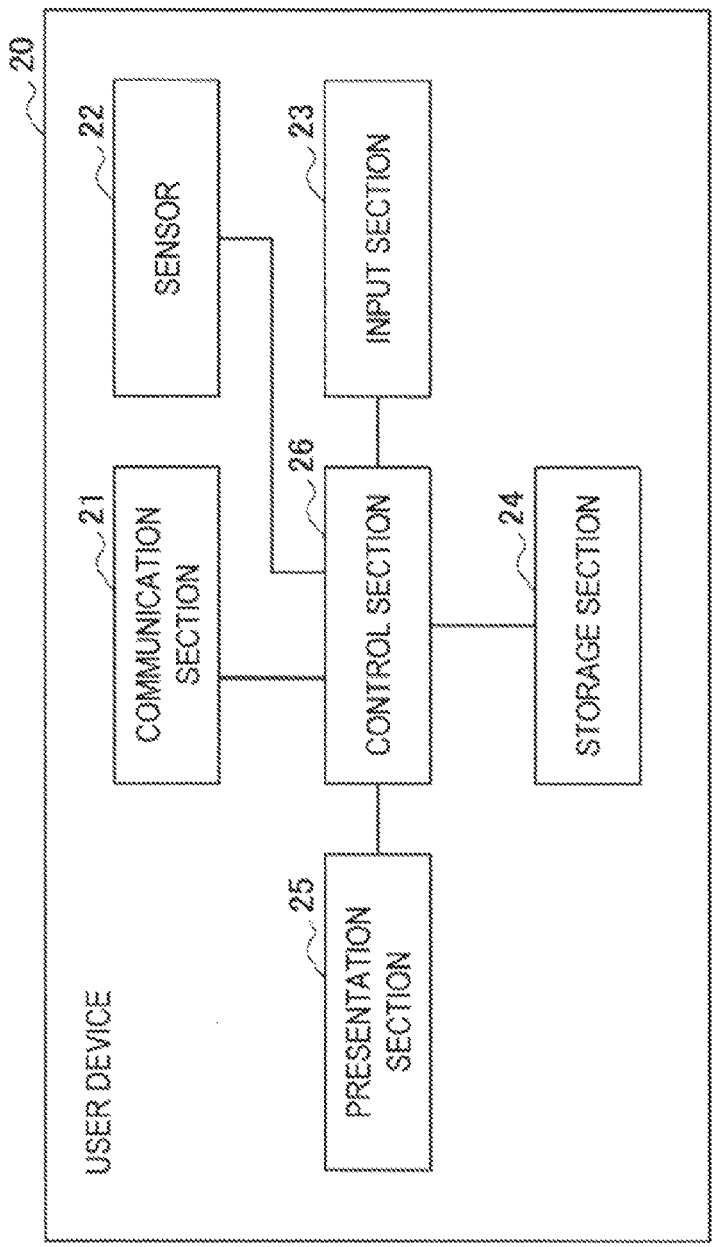
FIG. 3 is a block diagram showing a configuration of a user device.

As shown in FIG. 3, the user device 20 includes a communication section 21, a sensor 22, an input section 23, a storage section 24, a presentation section 25, and a control section 26.

The communication section 21 is communicable with the server 30 via the network 50, and transmits/receives various types of signals to/from the server 30.

The sensor 22 detects actual power consumption of each device owned by a user. Examples of the device include an air conditioner, a TV, a personal computer, lighting equipment, a refrigerator, a washing machine, and a toilet seat device, which are installed in the user's house, and also include an electric vehicle and an electric bicycle. The sensor 22 generates power consumption information regarding the detected actual power consumption, and outputs the power consumption information to the control section 26. Note that the sensor 22 for a mobile-type device such as the electric vehicle or the electric bicycle generates a radio signal relative to the actual power consumption to the communication section 21.

The input section 23 is a touch panel provided on a surface of the presentation section 25, and outputs input operation information corresponding to an operation performed by the user (for example, touching a specific position of the input section 23, or moving a finger in a specific direction from the specific position) to the control section 26.

The storage section 24 stores therein various types of information necessary for processing performed by the user device 20, such as a program and image information. In particular, the storage section 24 stores therein a user report table and an ecological action list transmitted from the server 30. In the user report table, an ecological action and an individual estimated power consumption graph are stored in association with each other. The individual estimated power consumption graph will be described later. In the ecological action list, ecological actions which are considered capable of being carried out continuously by the user are listed. Note that, in the initial state of the user device 20, that is, in a case where the user does not report any user action to the server 30 (for example, immediately after registering a user profile in the server 30), all ecological actions stored in the server 30 are listed in the ecological action list.

Figure 5:
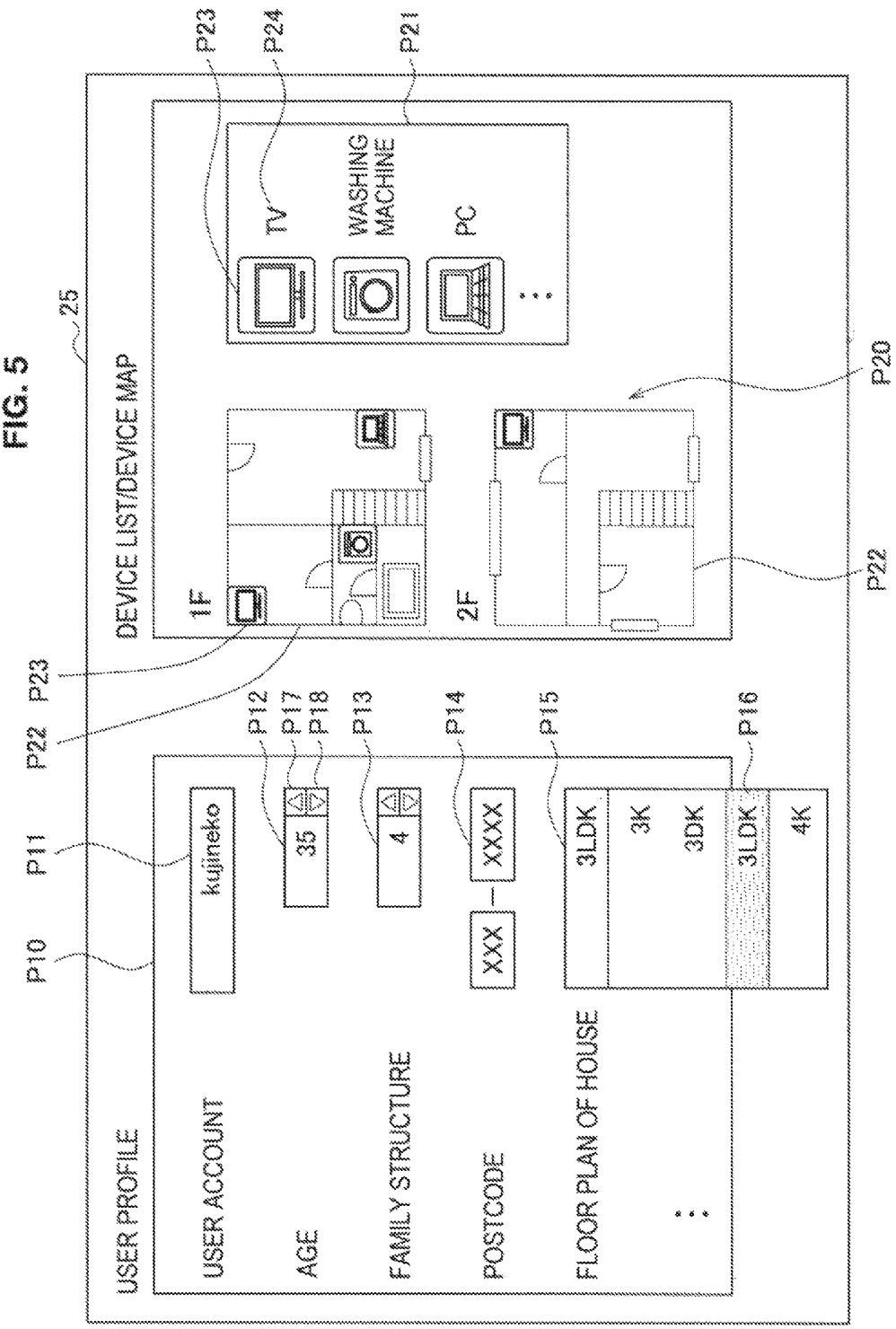
FIG. 5 is an explanatory diagram showing an example of an image displayed when a user enters a user profile.

The presentation section 25 displays various types of images, and outputs a sound. In this way, the presentation section 25 presents various types of information to the user. FIG. 5 shows an example of a user information-reporting interface, which is displayed when the user enters a user profile and a device map P20. The user profile is used when the server 30 selects an ecological action that can be continuously carried out by the user, for example. As the user profile, there can be considered a user account (user ID), age, a family structure, a postcode, a floor plan of a house, a hobby of the user, and preference, for example.

The user information-reporting interface includes a user profile-reporting interface P10, a device map P20, a device list P21, and an onscreen keyboard which is not shown. The user profile-reporting interface P10 displays entry fields for respective categories of the user profile, for example, a user account entry field P11, an age entry field P12, a family structure entry field P13, a postcode entry field P14, and a floor plan entry field P15. The user touches any one of those entry fields and thus selects a category. After that, the user enters a category value into the selected category (that is, the user enters information classified into the category among the user profile, for example, "35" into the category of "age"). Note that, in the entry field for simply entering a number, a number increase button P17 and a number decrease button P18 are displayed. When the user touches the number increase button P17, the number in the entry field is increased, and when the user touches the number decrease button P18, the number in the entry field is decreased. The user can also enter a number using those buttons P17 and P18. Further, for the entry field for causing the user to select any one of the multiple category values, a pull-down menu P16 is prepared. That is, when the user touches a relevant entry field, for example, when the user touches a floor plan entry field P15, the pull-down menu P16 is displayed, in which multiple floor plan category values are drawn. The user selects the floor plan corresponding to the floor plan of the user's house from among those category values. The selected category value is highlighted.

The device map P20 includes a floor plan map P22 showing the floor plan of the user's house and a device icon P23 showing a device. The floor plan map P22 may be the one that has been registered in a user device 20 in advance, or may be the one created by the user and reMstered in the user device 20. The device icons P23 in the floor plan map P22 show a placement of devices. Note that, in the example shown in FIG. 5, there are two living rooms on the first floor and one living room on the second floor. The living rooms on the first floor are also referred to as "living room A" and "living room B", respectively, and the living room on the second floor is also referred to as "living room C". A TV is installed in each of "living room A" and "living room C", and a personal computer is installed in "living room B".

The device list P21 includes multiple device icons P23 and text images P24 explaining the contents of the respective device icons. The user touches any one of the device icons P23 listed in the device list P21, and drags the touched device icon P23 to a desired position within the floor plan map P22. Note that in order for the user to drag the device icon P23, the user may move his/her finger as it is, which is in contact with the input section 23 (that is, the user may move his/her finger in the state of keeping the finger in contact with the input section 23). Additionally, the user also enters model numbers of the respective devices. Specifically, the user touches a device icon P23 in the device map P20. After that, the presentation section 25 displays the entry field of the model number, and the user enters the model number into the entry field.

Figure 6:
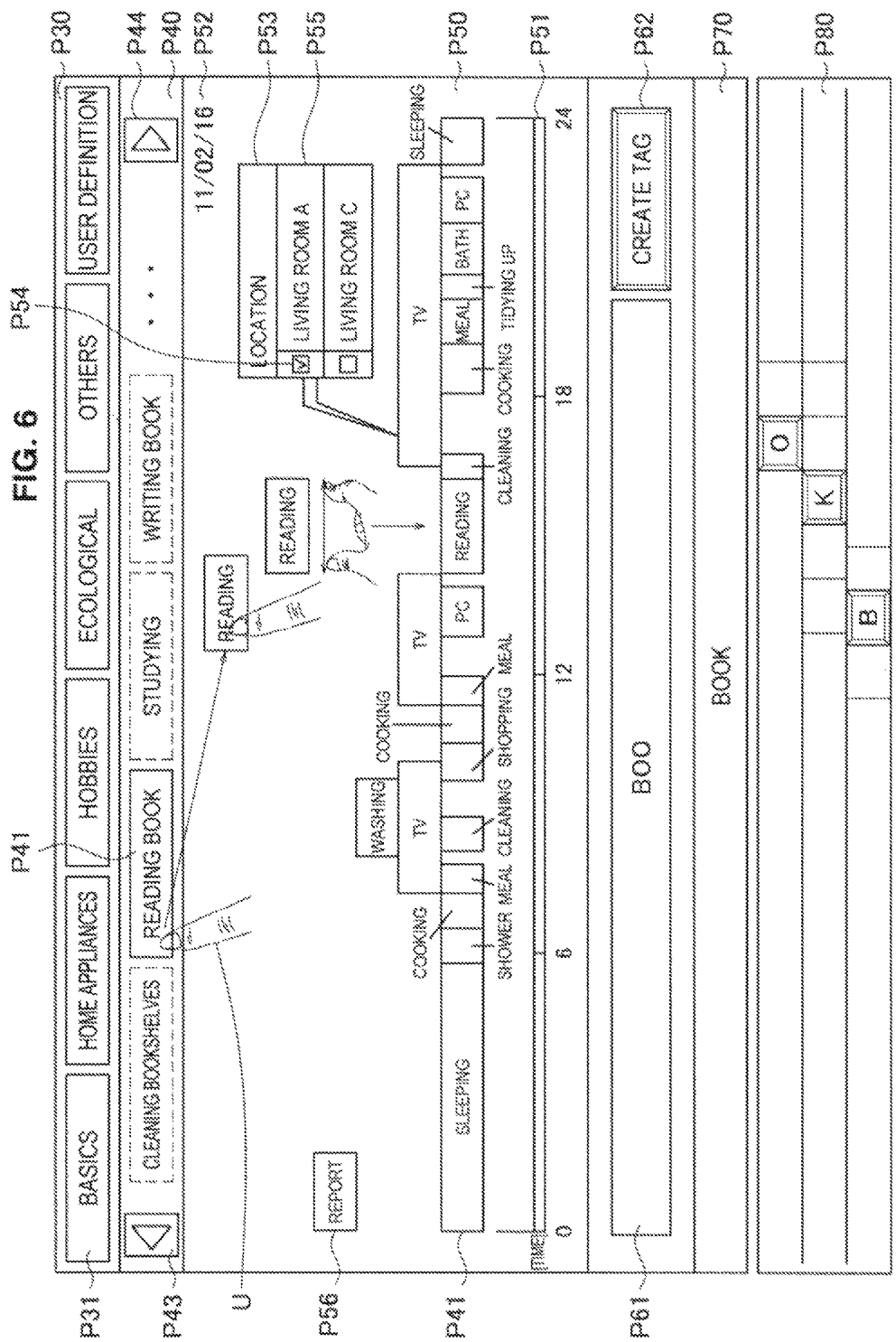
FIG. 6 is an explanatory diagram showing an example of an image displayed when the user makes a report on actions performed during a single day.

FIG. 6 shows an example of a user action-reporting interface, which is displayed when the user reports a user action to the server 30. The user action-reporting interface includes a genre display area P30, an in-genre user action display area P40, a user action time line display area P50, an input information display area P61, a tag creation button P62, a predictive conversion information display area P70, and an onscreen keyboard P80.

In the genre display area P30, there are displayed multiple genre-selecting buttons P31 each showing a genre (type) of a user action. Here, examples of the user action included in "basics" include user actions related to the user's everyday life, such as "sleeping", "meal", "bath", "shower", "cooking", "cleaning", and "shopping". Examples of the user action included in "home appliances" include user actions using a device, such as "TV", "personal computer (PC)", and "lighting". Examples of the user action included in "hobbies" include user actions, among the user actions related to the user's hobby, which do not use a device, such as "reading" and "jogging". Examples of the user action included in "ecological" include ecological actions listed in the ecological action list, such as "opening curtain", "closing curtain", "turning off lighting", "cleaning without using a vacuum cleaner", "setting air conditioner (heating) to 24° C.", "setting air conditioner (cooling) to 28° C.", "not watching TV", and "not using hair dryer". The ecological actions listed in the ecological action list are those selected by the server 30 as the ecological actions that can be continuously carried out by the user. The user actions which do not belong to any of the above user actions are included in "others". In "user definition", the user actions which are defined by the user himself/herself are included. When the user touches any one of the genre-selecting buttons P31, a user action tag P41 corresponding to the touched genre-selecting button P31 is displayed on the in-genre user action display area P40.

In the in-genre user action display area P40, there are displayed the user action tag P41 indicating the contents of the user action and a scroll button P43, P44. The user reports the user action to the server 30 using the user action tag P41. For example, the user (user U) touches the user action tag P41 of "reading book" from among the user action tags P41. In this way, the user action tag P41 of "reading book" is selected. The selected user action tag P41 is highlighted. After that, the user drags the selected user action tag P41 to the user action time line display area P50, and enlarges/reduces the size of the user action tag P41 as necessary. After that, the user drops the user action tag P41 on the upper side of the part corresponding to the time period in which the user actually performs the user action, of a time line P51. Note that, in order for the user to enlarge/reduce the user action tag P41, the user may touch the both ends of the user action tag P41 with his/her fingers and then may change the distance between the fingers, for example. Further, in order for the user to drop the user action tag P41, the user may release his/her finger from the input section 23. The user drops each user action tag P41 on the time line P51, and thus identifies the user action at each time. In this way, the user generates information indicating a single-day user action, that is, user action time line information. The generated user action time line information is reported to the server 30. When the user touches the scroll button P43, P44, another user action tag P41 is displayed.

In the user action time line display area P50, there are displayed the user action tag P41 dropped by the user, the time line P51, a report date display area P52, an action location list P53, and a report button P56. The time line P51 is a line that displays hours from 0 o'clock to 24 o'clock of the report date, and can be enlarged/reduced by an operation performed by the user. In the report date display area P52, there is displayed a report date, that is, a date on which the user performed the user actions displayed on the user action time line display area P50. Basically, the report date is the day before the user actually enters the user action, but can be changed to any date by the user.

The action location list P53 is displayed for the user action tag P41, which is considered to have multiple action locations, out of the user action tags P41. That is, the user actions include actions that are necessarily performed at the same location everytime (for example, "washing" and "cooking") and actions that may be performed at multiple locations (for example, "cleaning", "watching TV", "using PC", and "lighting"). In the example shown in FIG. 5, since TV's are installed in the living room A on the first floor and the living room C on the second floor, respectively, the user action of "watching TV" may be performed in those living rooms. It is necessary that the server 30 grasp which action location the user action is performed at. Accordingly, as for the user action that may be performed in multiple locations, the user also reports the action location to the server 30. For this purpose, the action location list P53 is displayed. Specifically, the user touches any one of the user action tags P41. In the case where the action location is not identified for the touched user action tag P41, the action location list P53 corresponding to that user action tag P41 is displayed. In the action location list P53, a list of assumed action locations are displayed. Specifically, the action location list P53 is displayed in a manner that a check box display area P54 and an action location display area P55 are associated with each other. A check box is displayed in the check box display area P54, and an assumed action location is displayed in the action location display area P55. The user touches the check box corresponding to the location at which the user action is performed. In this way, a check mark is entered in the check box, and the action location is reported to the server 30.

The report button P56 is touched when the user reports the user action to the server 30. That is, in the case where the user determines that most of the user actions are entered, the user touches the report button P56. In this way, the user action is reported to the server 30.

In the input information display area P61, text information entered by the user is displayed. The tag creation button P62 is used when the user creates the user action tag P41. That is, the user enters the user action, and then touches the tag creation button P62. In this way, the entered user action is registered in the genre of "user definition" as the user action tag P41. In this case, the user also enters information necessary for a link table, which will be described later, that is, effect information EF and device type information ED.

In the predictive conversion information display area P70, text information predicted from text information entered by the user is displayed. The user touches the text information displayed in the predictive conversion information display area P70, and thus, the user action tag P41 corresponding to the text information is displayed in the in-genre user action display area P40.

The onscreen keyboard P80 is formed of multiple keys each having different text information drawn thereon, and the user touches those keys to thereby enter text information.

Figure 7:
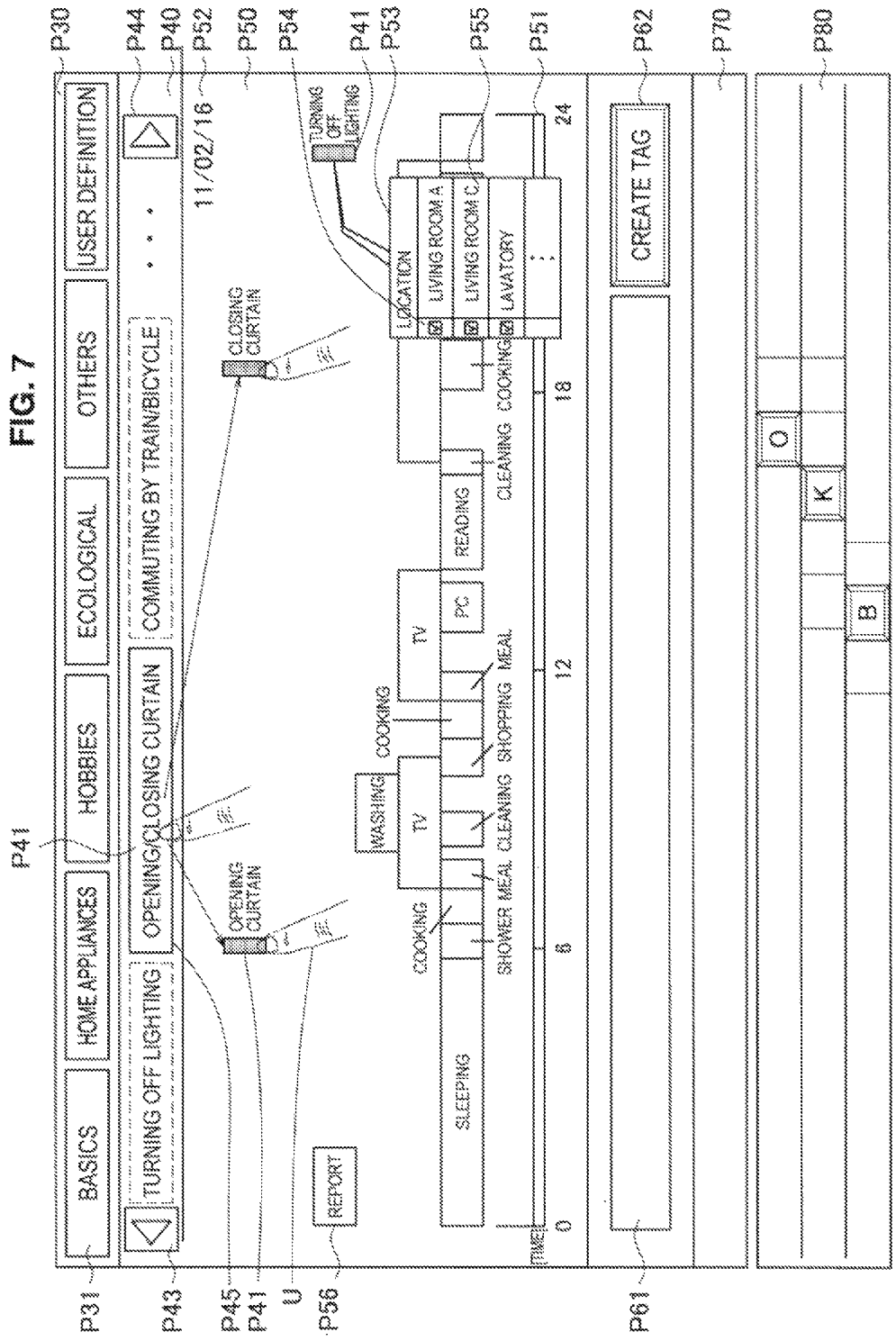
FIG. 7 is an explanatory diagram showing an example of the image displayed when the user makes a report on actions performed during a single day.

FIG. 7 shows a state when an ecological action is reported from among the user actions. That is, first, the user touches the genre-selecting button P31 of "ecological". In this way, the user action tags P41 related to the ecological action are displayed in the in-genre user action display area P40. Note that there is a user action tag P41 in which multiple types thereof are gathered therein (hereinafter, such a user action tag P41 may also be referred to as "multi-action tag P45"). For example, a multi-action tag P45 of "opening/closing curtain" corresponds to a user action tag P41 of "opening curtain" and a user action tag P41 of "closing curtain". In the same manner, a multi-action tag P45 of "commuting by train/bicycle" corresponds to a user action tag P41 of "commuting by train" and a user action tag P41 of "commuting by bicycle". In the multi-action tag P45, since pieces of text information each indicating a user action are divided with "/", the user selects a user action tag P41 included in the multi-action tag P45 by touching one of the pieces of text information divided using "/". For example, in the case of selecting the user action tag P41 of "opening curtain", the user touches the text information of "opening" out of the multi-action tag P45 of "opening/closing curtain". In this way, the user selects the user action tag P41 of "opening curtain". After that, the user performs the processing in the same manner as described above to thereby drop the user action tag P41.

Further, in FIG. 7, with respect to a user action tag P41 of "turning off lighting", the action location list P53 is displayed. Since the lighting is installed at every location, the number of action locations listed in the action location list P53 becomes large.

Figure 8:
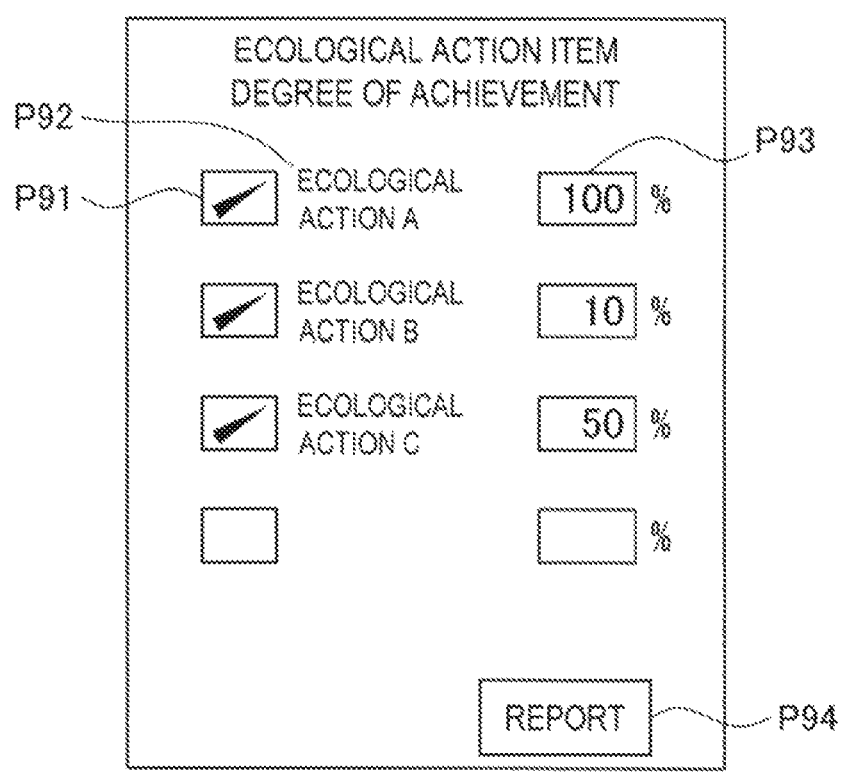
FIG. 8 is an explanatory diagram showing an example of an image displayed when the user makes a report on ecological actions performed during a single day.

FIG. 8 shows a degree-of-achievement-reporting interface displayed when the user reports a degree of achievement of each ecological action to the server 30. The degree-of-achievement-reporting interface includes a check box display area P91, an ecological action display area P92, a degree-of-achievement display area P93, a report button P94, and an onscreen keyboard which is not shown.

The check box display area P91, the ecological action display area P92, and the degree-of-achievement display area P93 are associated with one another. A check box is displayed in the check box display area P91, an ecological action list is displayed in the ecological action display area P92, and a degree of achievement entered by the user is displayed in the degree-of-achievement display area P93. That is, in the case of performing an ecological action, the user touches the corresponding check box. In this way, a check mark is entered in the check box. In addition, the user touches the corresponding degree-of-achievement display area P93, and then enters the degree of achievement using the onscreen keyboard. The degree of achievement is the user's subjective evaluation value. For example, with respect to an ecological action "setting air conditioner (heating) to 25° C.", in the case where the user keeps the air conditioner to 25° C. for all hours of operation, the degree of achievement may be determined to be 100, and in the case of keeping the air conditioner to 25° C. for half of the time period out of all hours of operation, the degree of achievement may be determined to be 50.

The report button P94 is touched when the user reports the degree of achievement to the server 30. That is, in the case where the user determines that most of the degrees of achievement are entered, the user touches the report button P94. In this way, the degree of achievement of each ecological action is reported to the server 30.

Figure 9:
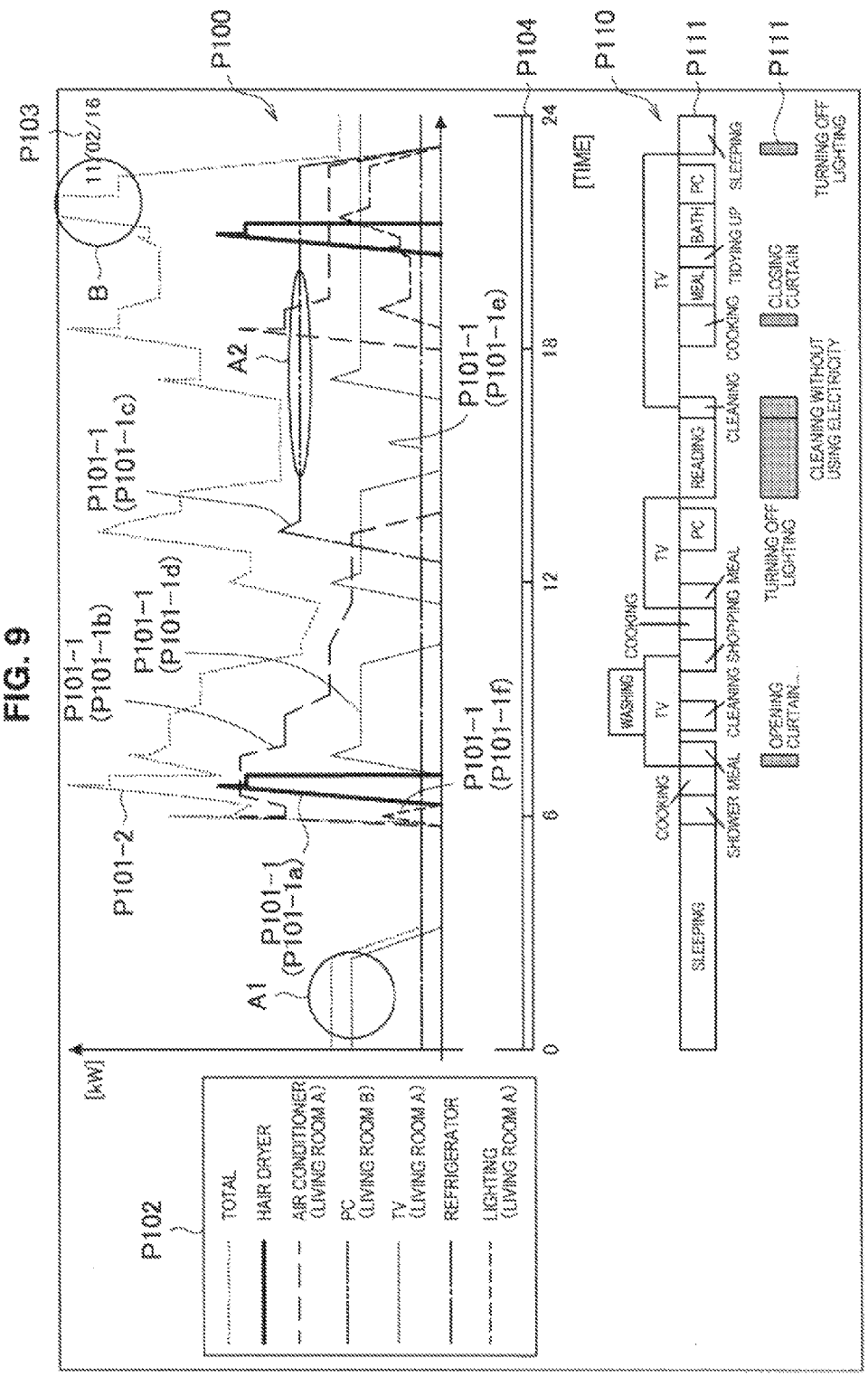
FIG. 9 is an explanatory diagram showing an example of an actual power consumption graph displayed in the present embodiment.

FIG. 9 shows an example of a user action evaluation image which is displayed after the user reports a user action. The user action evaluation image includes an actual power consumption graph display area P100 and a user action time line display area P110.

In the actual power consumption graph display area P100, there are displayed an individual actual power consumption graph P101-1, a total actual power consumption graph P101-2, an actual power consumption breakdown display area P102, a report date display area P103, and a time line P104. The individual actual power consumption graph P101-1 shows a state of transition of actual power consumption of each device, that is, individual actual power consumption, along with the elapse of time. The total actual power consumption graph P101-2 is obtained by adding up the individual actual power consumption graphs P101-1. In other words, the total actual power consumption graph P101-2 shows a state of transition of the total actual power consumption along with the elapse of time, the total actual power consumption being a value obtained by adding up individual actual power consumptions (which are displayed in the actual power consumption graph display area P100 out of the individual actual power consumptions).

For example, in the example shown in FIG. 9, in the actual power consumption graph display area P100, there are displayed individual actual power consumption graphs P101-1a to P101-1f and the total actual power consumption graph P101-2. The actual power consumption graph P101-1a shows a transition of power consumption of a hair dryer. The actual power consumption graph P101-1b shows a transition of power consumption of an air conditioner installed in the living room A. The actual power consumption graph P101-1c shows a transition of power consumption of a personal computer installed in the living room B. The actual power consumption graph P101-1d shows a transition of power consumption of a TV installed in the living room A. The actual power consumption graph P101-1e shows a transition of power consumption of a refrigerator. The actual power consumption graph P101-1f shows a transition of power consumption of lighting installed in the living room A. The total actual power consumption graph P101-2 shows the total of the individual actual power consumption graphs P101-1a to P101-1f. The user can freely change the type of individual actual power consumption graph P101-1 to be displayed in the actual power consumption graph display area P100.

In the actual power consumption breakdown display area P102, there is displayed correspondence relationships between the actual power consumption graphs P101 and the devices. In the report date display area P103, the above-mentioned report date is displayed. The time line P104 is the same as the time line P51 shown in FIG. 6 and the like.

In the user action time line display area P110, a user action tag P111 is displayed by the time line P104. The user action tag P111 is the same as the user action tag P41 shown in FIG. 6 and the like. That is, in the user action time line display area P110, the user action reported by the user using the user action-reporting interface. In this way, the user can compare the single-day user action with the transition of power consumption.

Note that, in an area A1, although the user action of "watching TV" is not reported, the power consumption of the TV is larger than 0. In the same manner, in an area A2, although the user action of "using PC" is not reported, the power consumption of the personal computer is larger than 0. Accordingly, in the areas A1 and A2, there is a possibility that the user does not recognize (does not pay attention to) his/her user action. Further, since the individual actual power consumption of those user actions is larger than the individual estimated power consumption to be described later, improvement thereof is necessary. Accordingly, in the case where such an area exists, the presentation section 25 presents such user actions and also presents ecological actions for solving those events to the user. For example, the presentation section 25 presents the following information: "TV is left ON in late at night. Switch off TV before going to bed."; and "PC is left ON. Switch off PC when not in use." Note that a series of processing including determining whether the area exists is performed by the control section 26.

Further, since an area B has outstandingly high total power consumption, it is necessary to encourage the user to reduce the power consumption, but there is a possibility that a user action that is a cause for the increase in power consumption is attributed to preference or lifestyle of the user. For example, although a cause of high total power consumption in the area B is the use of a hair dryer, the user may use the hair dryer at this time everyday. It is difficult for the user to pay attention to such a user action. In this case, even if the ecological action of "not using hair dryer" is presented to the user, it is difficult to say that the ecological action is continuously practicable for the user. Accordingly, in this case, the presentation section 25 presents an ecological action for reducing the difference with an average power consumption of other users. For example, the presentation section 25 presents the following information: "You are using the hair dryer for 1 minute longer than ordinary people. This is equivalent to the power consumption that can be reduced by lowering the temperature of shower water by 1° C." That is, the presentation section 25 presents the ecological action of "lowering the temperature of shower water by 1° C.". In the same manner, in the case where the TV power consumption of the user is larger than TV power consumption of other users, the presentation section 25 presents the following information: "You are using the TV for 1 hour longer than ordinary people. This is equivalent to the power consumption that can be reduced by spending a single day in a state in which the air conditioner (cooling) is set 3° C. higher than now." That is, the presentation section 25 presents the ecological action of "raising the temperature setting of the air conditioner by 3° C.". Note that, as the method of presenting information, there can be considered image display and audio output.

Figure 10:
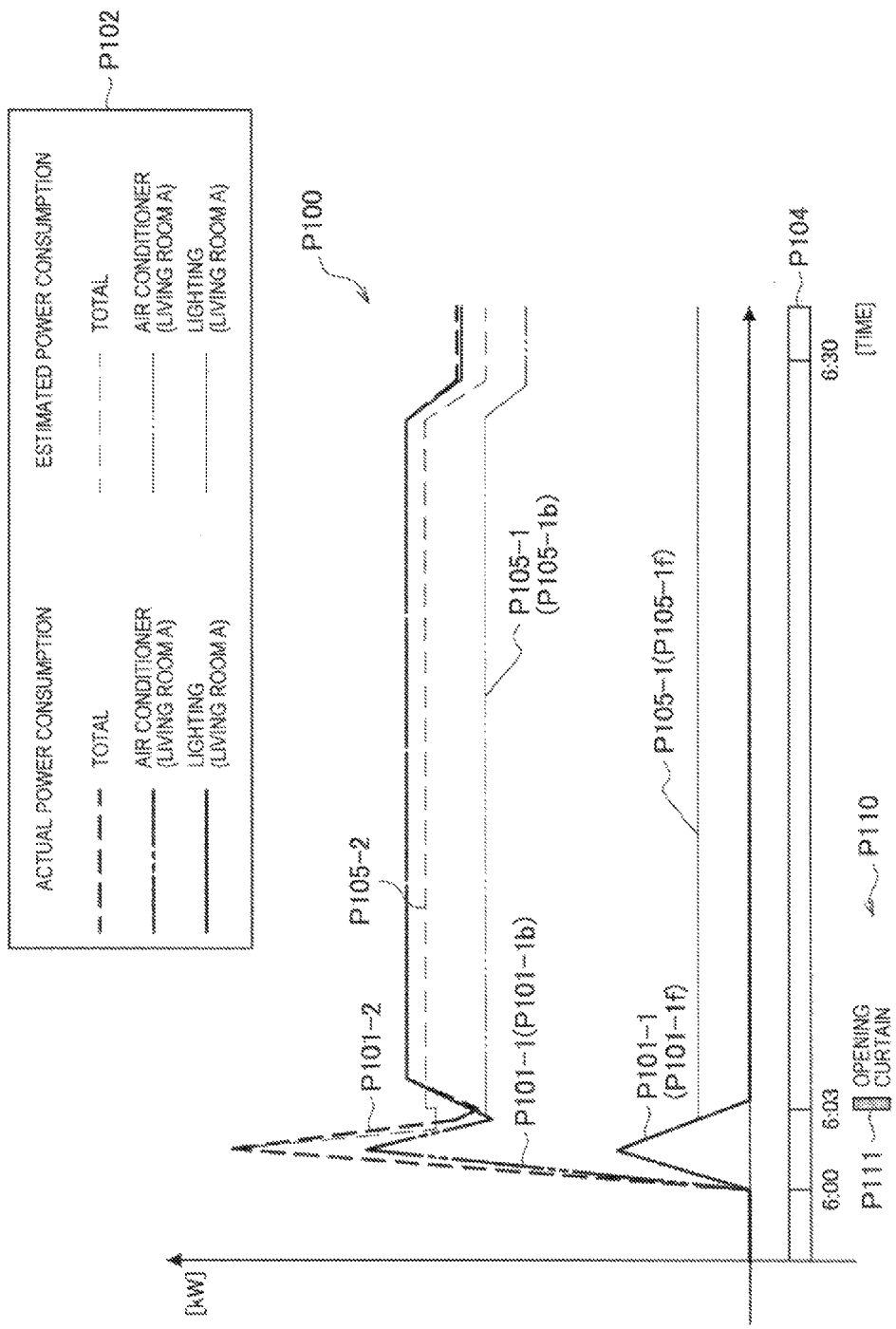
FIG. 10 is an explanatory diagram showing an example of the actual power consumption graph displayed in the present embodiment.

Further, when the user touches a user action tag P111 indicating an ecological action among the user action tags P111, the presentation section 25 displays an enlarged evaluation image as shown in FIG. 10, in which a part of the touched user action tag P111 is enlarged, out of the user action evaluation image. In the actual power consumption graph display area P100 of the enlarged evaluation image, there are displayed the actual power consumption graphs P101-1 in which the power consumptions are changed owing to the selected user action (user action indicated by the touched user action tag P111). In the example shown in FIG. 10, since the power consumption of the lighting and the power consumption of the air conditioner are changing owing to the action of opening a curtain by the user, the individual actual power consumption graphs P101-1*b* and P101-1*f*, and the total actual power consumption graph P101-2 are displayed in the actual power consumption graph display area P100.

Further, in the actual power consumption graph display area P100 of the enlarged evaluation image, there are displayed an individual estimated power consumption graph P105-1 and a total estimated power consumption graph P105-2. The individual estimated power consumption graph P105-1 shows a state of transition of actual power consumption of each device that is estimated when the selected user action is not performed, that is, individual estimated power consumption, along with the elapse of time. The total estimated power consumption graph P105-2 indicates the total of the individual estimated power consumption graphs P105-1. In other words, the total estimated power consumption graph P105-2 shows a state of transition of the total estimated power consumption along with the elapse of time, the total estimated power consumption being a value obtained by adding up individual estimated power consumptions (which are displayed in the actual power consumption graph display area P100 out of the individual estimated power consumptions).

The individual estimated power consumption graph P105-1 and the total estimated power consumption graph P105-2 are displayed in a superimposed manner on (that is, in association with) the corresponding individual actual power consumption graph P101-1 and the corresponding total actual power consumption graph P101-2, respectively. In order that the associations of those graphs become clear, the graphs in association with each other may be displayed with different line types and with the same color, for example. In the example shown in FIG. 10, the individual estimated power consumption graphs P105-1*b* and P105-1*f*, and the total estimated power consumption graph P105-2 are displayed in the actual power consumption graph display area P100. The individual estimated power consumption graph P105-1*b* shows the actual power consumption of the air conditioner (heating) that is estimated when the user does not perform the user action of "opening curtain", and the individual estimated power consumption graph P105-1*f* shows the actual power consumption of the lighting that is estimated when the user does not perform the user action of "opening curtain". The total actual power consumption graph P105-2 is obtained by adding up the individual estimated power consumption graphs P105-1*b* and P105-1*f*.

In the case where the value of the individual actual power consumption graph P101-1 of one device becomes smaller than the value of the individual estimated power consumption graph P105-1 of the device by performing the selected user action, it means that the actual power consumption of the device is reduced by performing the selected user action. Accordingly, in this case, it is likely that the selected user action has an ecological effect to the device. On the other hand, in the case where the value of the actual power consumption graph P101-1 is equal to or more than the individual estimated power consumption graph P105-1, it means that the actual power consumption does not change or may even increase, even when the selected user action is performed. Accordingly, in this case, it is likely that the selected user action has no ecological effect.

However, it is necessary that whether the selected user action has an ecological effect is collectively determined. That is, the selected user action may have an ecological effect to one device, but may not have any ecological effect to another device. For example, in the example shown in FIG. 10, the selected user action is the user action of "opening curtain". By opening a curtain, the individual actual power consumption graph P101-1*f* becomes smaller than the value of the individual estimated power consumption graph P105-1*f*. In the case where the curtain is opened (that is, the selected user action is performed), the sunlight comes into the living room A, and hence, the lighting is made redundant. On the other hand, in the case where the curtain is not opened (that is, the selected user action is not performed), the sunlight does not come into the living room A, and hence, the lighting is necessary. Accordingly, it is considered that there is obtained the result as described above. Therefore, the selected user action of "opening curtain" has an ecological effect to the lighting.

In contrast, the value of the individual actual power consumption graph P101-1*b* is larger than the value of the individual estimated power consumption graph P105-1*b*. In the case where the curtain is opened, it becomes easier for the heat inside the living room A to escape to the outside (that is, it becomes easier that the temperature of the living room A is lowered). On the other hand, in the case where the curtain is not opened, it becomes difficult for the heat inside the living room A to escape to the outside. Accordingly, it is considered that there is obtained the result as described above. Therefore, the selected user action of "opening curtain" does not have an ecological effect to the air conditioner (heating).

In addition, the value of the total actual power consumption graph P101-2 is larger than the value of the total estimated power consumption graph P105-2. Therefore, the selected user action of "opening curtain" does not have ecological effects collectively. However, during the time period (for example, after 9:30) in which the temperature of the living room A is easily raised, it is considered that the actual power consumption of the air conditioner (heating) does not increase even when the selected user action of "opening curtain" is performed. Accordingly, during this time period, it is considered that the selected user action of "opening curtain" also has an ecological effect collectively.

Accordingly, in the case where the selected user action is classified into "ecological" and the value of the total actual power consumption graph P101-2 is equal to or more than the value of the total estimated power consumption graph P105-2, the presentation section 25 presents the time period in which the value of the total actual power consumption graph P101-2 is smaller than the value of the total estimated power consumption graph P105-2. For example, the presentation section 25 presents the following information: "No ecological effect can be expected in this reported time period. Open curtain after 9:30."

Figure 11:
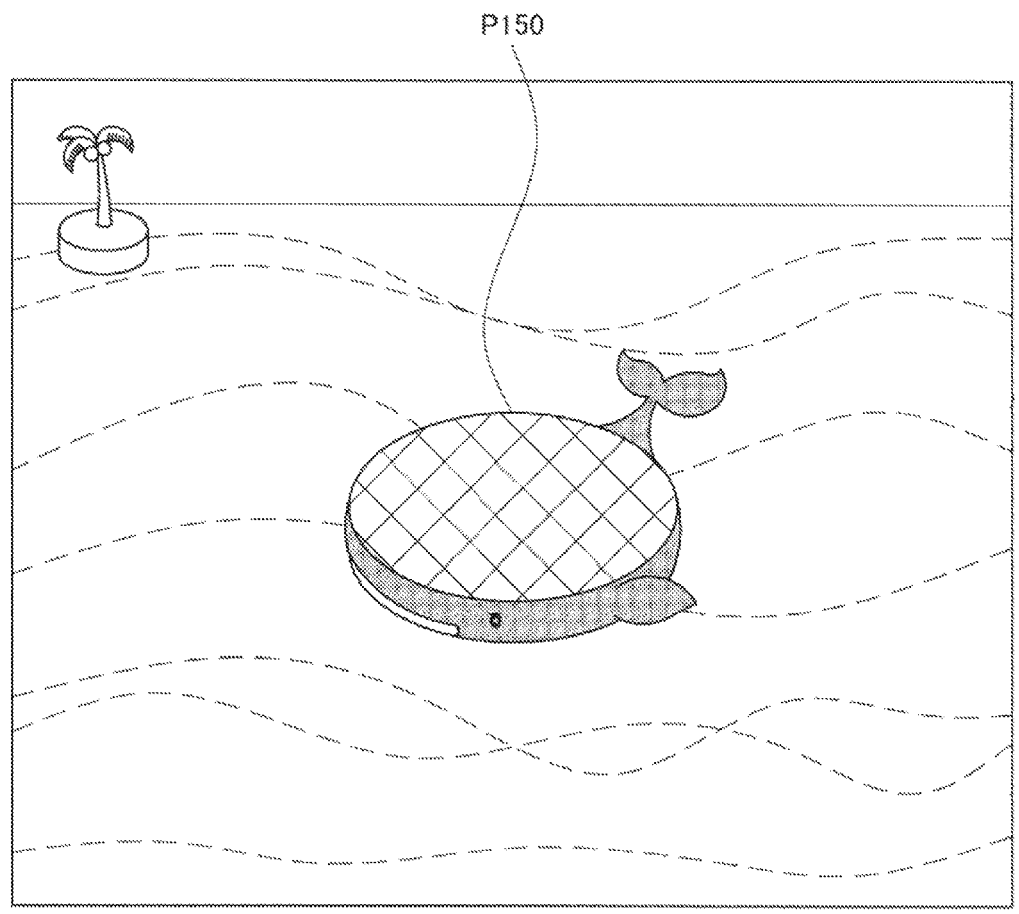
FIG. 11 is an explanatory diagram showing an example of an image displayed as a reward for an ecological action performed by the user.
Figure 12:
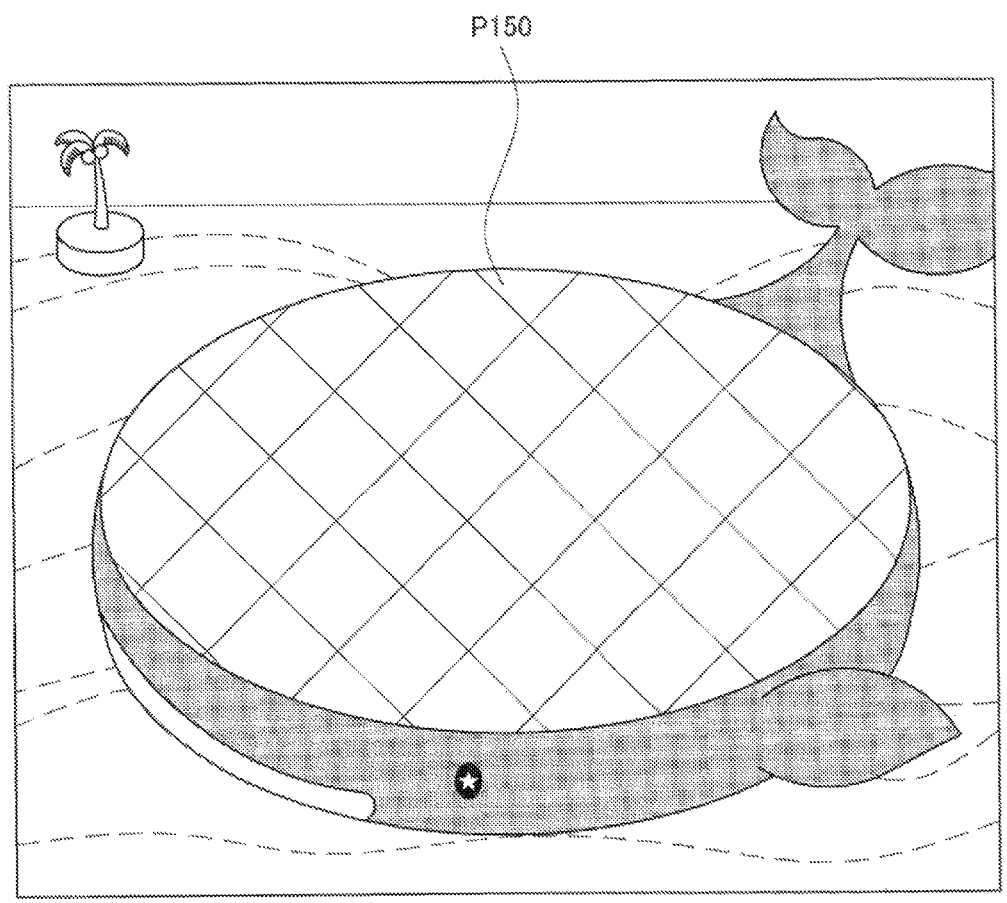
FIG. 12 is an explanatory diagram showing an example of the image displayed as a reward for an ecological action performed by the user.

FIG. 11 and FIG. 12 each show an example of a reward image displayed in accordance with the degree of achievement or the like reported by the user. That is, as shown in FIG. 11 and FIG. 12, the presentation section 25 displays a cartoon character image P150 having a size corresponding to the degree of achievement reported by the user. Accordingly, the user's willingness to make the cartoon character image P150 larger increases, and as a result, the user can find the significance in executing the ecological action.

The control section 26 shown in FIG. 3 controls each structural element of the user device 20, and also performs control of causing the presentation section 25 to present various types of information described above. Further, the control section 26 outputs various types of information (for example, a user action and a degree of achievement of an ecological action) entered by the user to the communication section 21. The communication section 21 generates signals relative to those pieces of information and transmits the signals to the server 30.

[2-2. Configuration of Storage Device]

Figure 4:
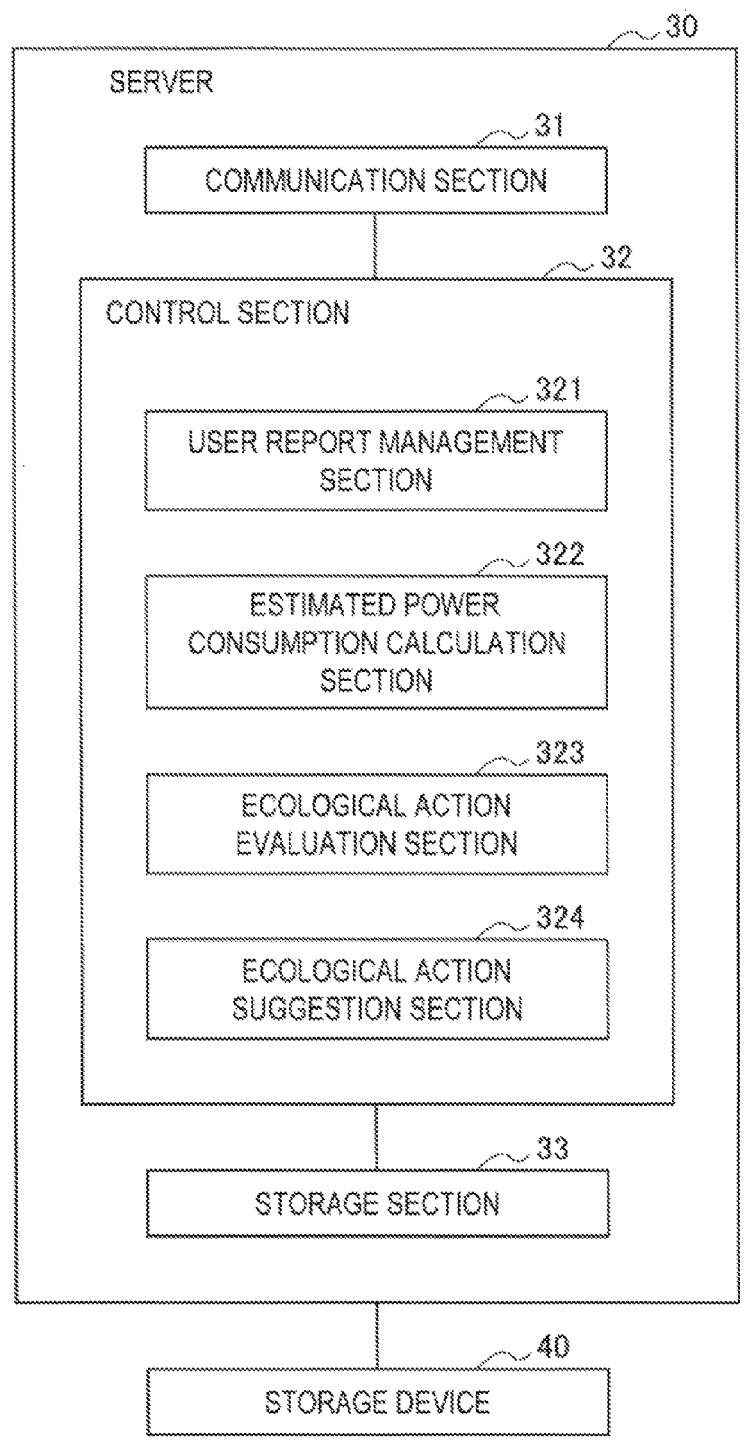
FIG. 4 is a block diagram showing a configuration of a server.

Next, a configuration of the storage device 40 shown in FIG. 4 will be described. The storage device 40 is connected to the server 30.

Figure 13:
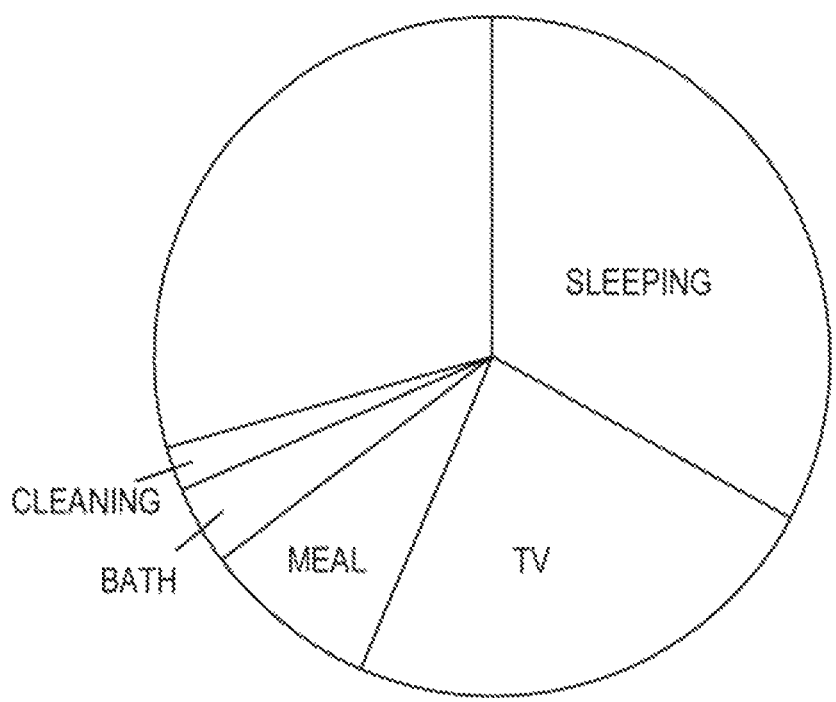
FIG. 13 is an explanatory diagram showing an example of information stored in a storage device.

The storage device 40 mainly stores information shown in FIGS. 13 to 27. FIG. 13 shows a user action pie chart stored in the storage device 40. The user action pie chart shows percentages of time periods of the respective user actions performed during a single day (execution time period/24). The storage device 40 stores the user action pie chart for each user.

Figure 14:
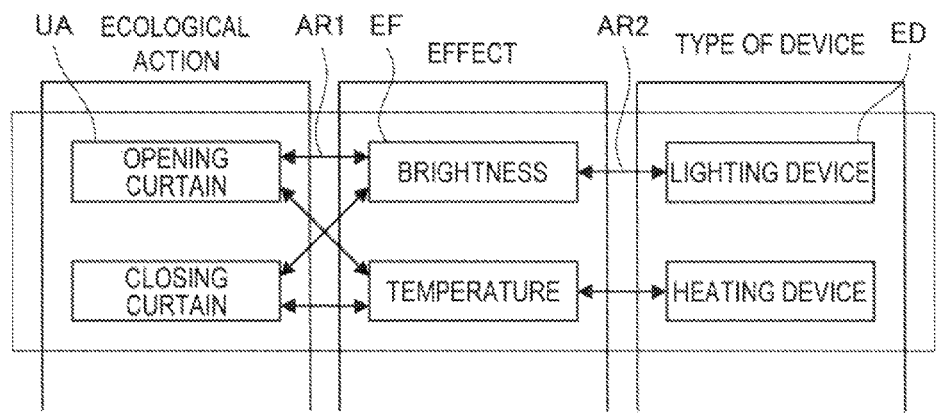
FIG. 14 is an explanatory diagram showing an example of information stored in the storage device.

FIG. 14 shows a link table. The link table shows a correspondence relationship between a user action, an effect of a device, and a category (type) of the device. The link table includes a user action table, an effect table, and a device type table, and, also includes arrow information AR1 and arrow information AR2 for associating those tables with each other.

The user action table is a table in which pieces of user action information UA each indicating a content of user action (for example, "opening curtain" and "closing curtain") are listed. The effect table is a table in which pieces of effect information EF each indicating an effect obtained by a device (for example, "brightness" and "temperature") are listed. The device type table is a table in which pieces of device type information ED each indicating a type of device (for example, "lighting device" and "heating device") are listed. The arrow information AR1 links the user action information UA to the effect information EF indicating an effect affected by the user action indicated by the user action information UA. For example, when a curtain is opened, the brightness and the temperature inside a room change, and hence, the arrow information AR1 links the user action information UA of "opening curtain" to the effect information EF indicating "brightness" and also to the effect information EF indicating "temperature". The arrow information AR2 links the device type information ED to the effect information EF indicating an effect exhibited by the device indicated by the device type information ED. For example, since the device of "lighting device" changes the "brightness" of the room, the arrow information AR2 links the device type information ED of "lighting device" to the effect information EF of "brightness". According to the link table, since it can be found that the power consumption of which device will be changed by a user action, the link table is used for calculating the estimated power consumption described above.

Figure 15:
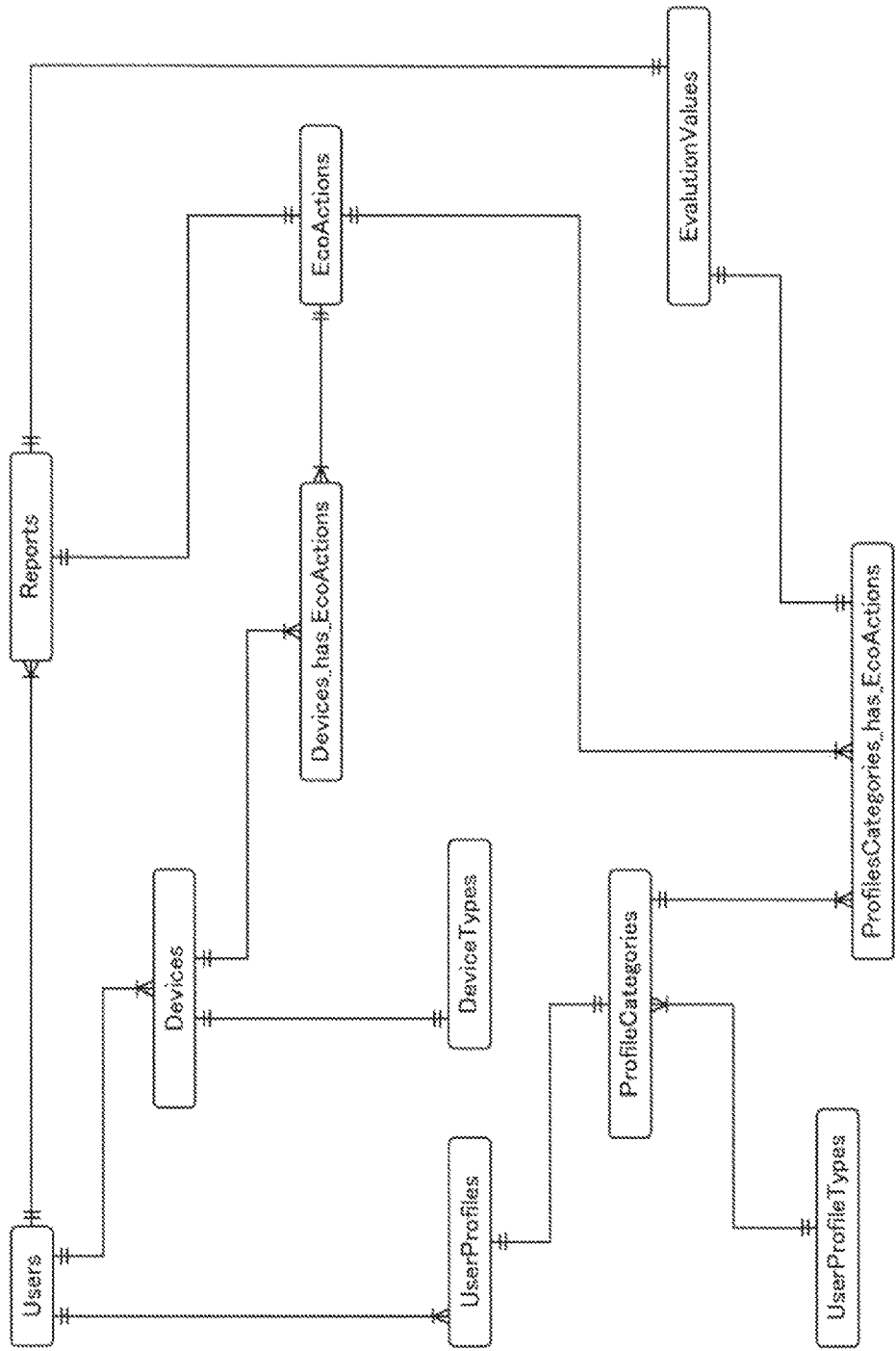
FIG. 15 is an explanatory diagram showing an example of information stored in the storage device.

FIG. 15 shows a linkage relationship between respective tables stored in the storage device 40. The storage device 40 stores a user report-related table group shown in FIG. 15, which includes a user table (Users), a device table (Devices), a device type table (DeviceTypes), a user report table (Reports), an ecological action table (EcoActions), a user profile table (UserProfiles), a profile category table (ProfileCategories), a user profile type table (UserProfileTypes), a profile category link table (ProfileCategories_has_EcoActions), a device link table (Devices_has_EcoActions), and an evaluation value table (EvaluationValues). Note that, for a user action in a user definition, the user sets the effect information EF and the device type information ED.

Figure 16:
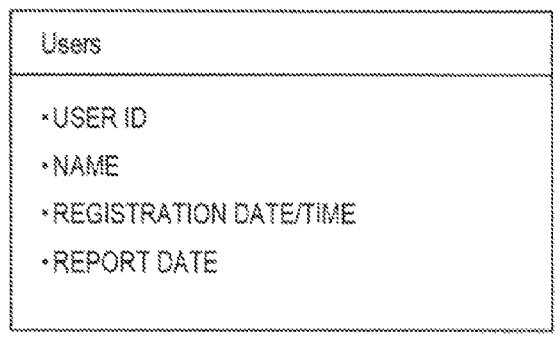
FIG. 16 is an explanatory diagram showing an example of information stored in the storage device.

As shown in FIG. 16, the user table records a user ID, name information, registration date/time information, and report date information, in association with one another. The user ID is identification information for uniquely identifying a user. The name information indicates a name of the user. The registration date/time information indicates date/time at which the user performs registration to the server 30. The report date information indicates the report date described above, that is, the date on which the user performs a user action.

Figure 17:
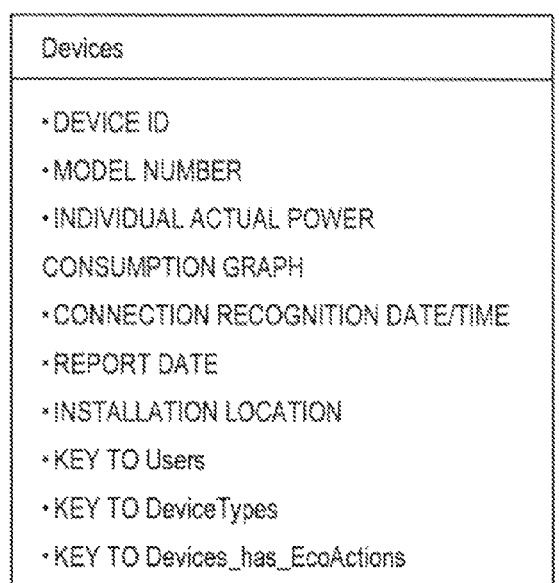
FIG. 17 is an explanatory diagram showing an example of information stored in the storage device.

As shown in FIG. 17, the device table records a device ID, model number information, an individual actual power consumption graph, connection recognition date/time information, report date information, installation location information, a key to the user table, a key to the device type table, and a key to the device link table, in association with one another.

The device ID is identification information for uniquely identifying a device. The model number information indicates a model number of the device. The individual actual power consumption graph indicates, as described above, the state of transition of the total actual power consumption of the device along with the elapse of time. The connection recognition date/time information indicates date/time at which the user reports the presence of the device. The user places a device on the device map P20, and thus, reports the presence of the device. The installation location information indicates an installation location of the device. The key to the user table is a key for associating the device table with the user table, and substantially indicates the user who owns the device. Note that, since one user may own multiple devices, multiple device tables are associated with one user table.

The key to the device type table is a key for associating the device table with the device type table, and substantially indicates the type of the device. One device table is associated with one device type table.

Figure 18:
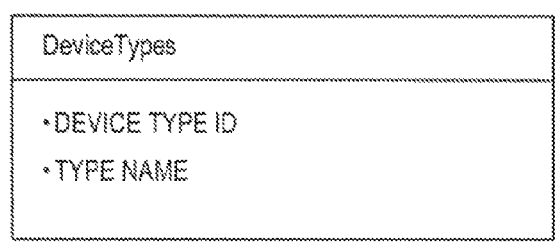
FIG. 18 is an explanatory diagram showing an example of information stored in the storage device.

As shown in FIG. 18, the device type table records a device type ID for uniquely identifying a type of a device, and type name information indicating a name of the type (for example, above-mentioned "lighting device" and "heating device"), in association with each other.

As shown in FIG. 19, the user report table records a report action item ID, report date information, degree-of-achievement information, start time information, end time information, an individual estimated power consumption graph, action location information, a key to the user table, a key to the ecological action table, and a key to the evaluation value table, in association with one another.

The report action item ID is identification information for uniquely identifying an ecological action reported by the user. The degree-of-achievement information indicates the degree of achievement of the ecological action. The start time information means the time at which the ecological action is started, and the end time information means the time at which the ecological action is terminated.

The individual estimated power consumption graph indicates, as described above, the state of transition of the individual estimated power consumption along with the elapse of time. The types of the individual estimated power consumption graphs to be stored in the user report table are determined based on the link table. For example, since the ecological action of "opening curtain" is related to "lighting device" and "heating device", when the report action item ID in the user report table indicates the ecological action of "opening curtain", the user report table stores therein the individual estimated power consumption graph of the lighting and the individual estimated power consumption graph of the air conditioner. The action location information indicates the location at which the ecological action is performed.

The key to the user table is a key for associating the user report table with the user table, and substantially indicates the user who reports the ecological action. Since the user may report multiple ecological actions, multiple user report tables are associated with one user table. The key to the ecological action table is a key for associating the user report table with the ecological action table, and substantially indicates the name of the ecological action reported by the user. One user report table corresponds to one ecological action table.

The key to the evaluation value table is a key for associating the user report table with the evaluation value table, and substantially indicates the evaluation value of the ecological action. The evaluation value is a value to be an index when the server 30 selects an ecological action to be presented to the user. A specific method of calculating the evaluation value will be described later.

As shown in FIG. 20, the ecological action table records an ecological action item ID, ecological action name information, a key to the profile category link table, and a key to the device link table, in association with one another.

The ecological action item ID is identification information for uniquely identifying an ecological action. The ecological action name information indicates the name of the ecological action. The key to the profile category link table is a key for associating the ecological action table with the profile category link table, and substantially indicates a category value (10's, male, and the like) of a user profile related to the ecological action.

The key to the device link table is a key for associating the ecological action table with the device link table, and substantially indicates a device related to the ecological action. In the present embodiment, in the case where there is a device in which the actual power consumption changes owing to an ecological action, the device is associated with the ecological action. This association is shown in the above-mentioned link table.

As shown in FIG. 21, the user profile table records a user profile-set value ID, a key to the user table, and a key to the profile category table, in association with one another. The user profile-set value ID is identification information allocated uniquely to each user profile table, and substantially indicates any one of categories (age, sex, and the like) constituting a user profile and any one of category values (20s, male, and the like) within the category. The key to the user table is a key for associating the user profile table with the user table, and substantially indicates the user who owns the user profile. While one user profile table corresponds to one category, one user may make reports on multiple categories, and hence, multiple user profile tables may be associated with one user table.

The key to the profile category table is a key for associating the user profile table with the profile category table. Here, the profile category table indicates any one of category values (10s, male, and the like) within any one of categories. Therefore, the key to the profile category table indicates substantially any one of category values within any one of categories.

Figure 22:
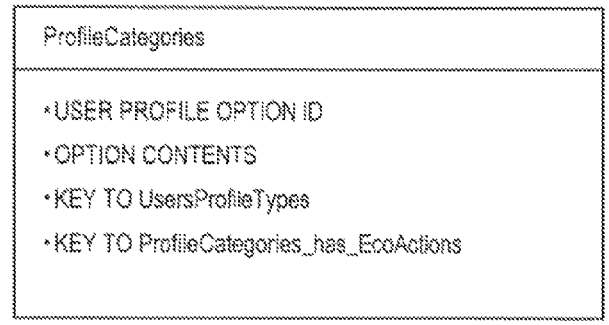
FIG. 22 is an explanatory diagram showing an example of information stored in the storage device.

As shown in FIG. 22, the profile category table records a user profile option ID, option contents information, a key to the user profile type table, and a key to the profile category link table, in association with one another. The user profile option ID is identification information for uniquely identifying a category value. The option contents information indicates contents of the category value. For example, in the case where the category value corresponds to the category of age, the option contents information represents 10's, 20's, and the like. The key to the user profile type table is a key for associating the profile category table with the user profile type table. Here, since the user profile type table shows categories of the user profile, the key to the user profile type table indicates substantially a category to which the category value belongs. Since multiple category values that can be selected by the user belong to one category (for example, multiple category values of "10's", "20's", "30's", and the like belong to the category of "age"), one user profile type table is associated with multiple profile category tables.

The key to the profile category link table is a key for associating the profile category table with the profile category link table, and substantially indicates an ecological action related to the category value.

Figure 23:
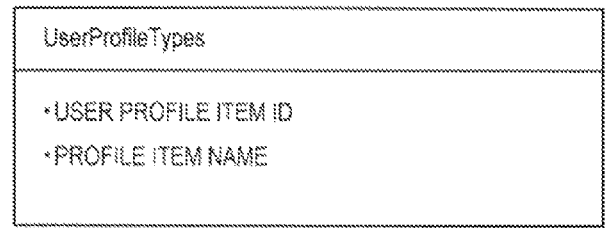
FIG. 23 is an explanatory diagram showing an example of information stored in the storage device.

As shown in FIG. 23, the user profile type table records a user profile item ID and profile item name information in association with each other. The user profile item ID is identification information for uniquely identifying a category of the user profile, and the profile item name information indicates a category name (age, sex, and the like) of the user profile.

Figure 24:
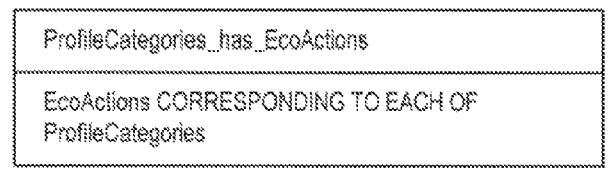
FIG. 24 is an explanatory diagram showing an example of information stored in the storage device.

As shown in FIG. 24, the profile category link table is a table for associating all category values reported by the user with all ecological actions reported by the user.

Figure 25:
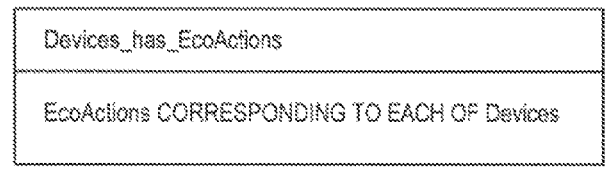
FIG. 25 is an explanatory diagram showing an example of information stored in the storage device.

As shown in FIG. 25, the device link table is a table for associating a device with an ecological action related thereto. This association is shown in the link table.

Figure 26:
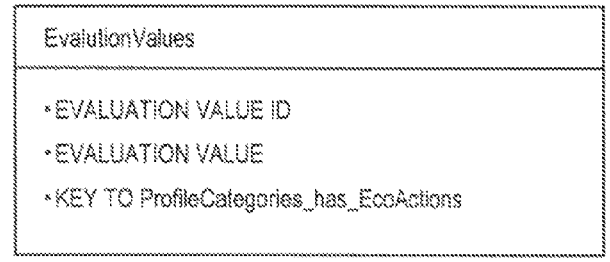
FIG. 26 is an explanatory diagram showing an example of information stored in the storage device.
Figure 28:
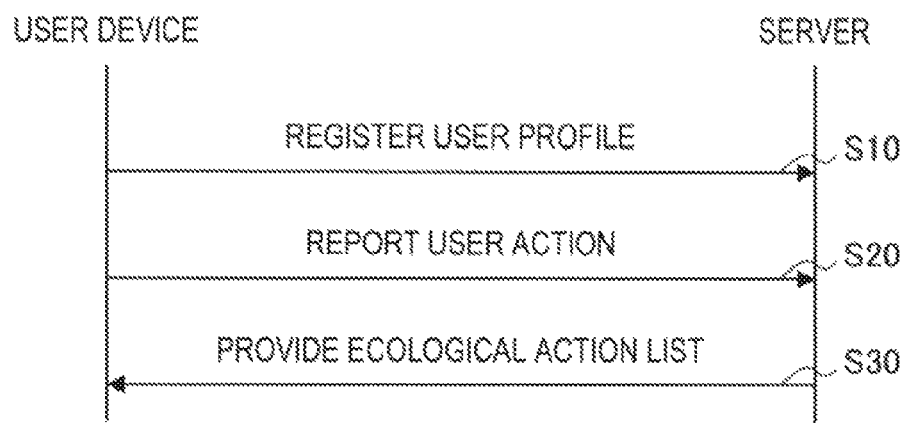
FIG. 28 is a sequence diagram showing a procedure of processing performed by an information processing system.
Figure 29A:
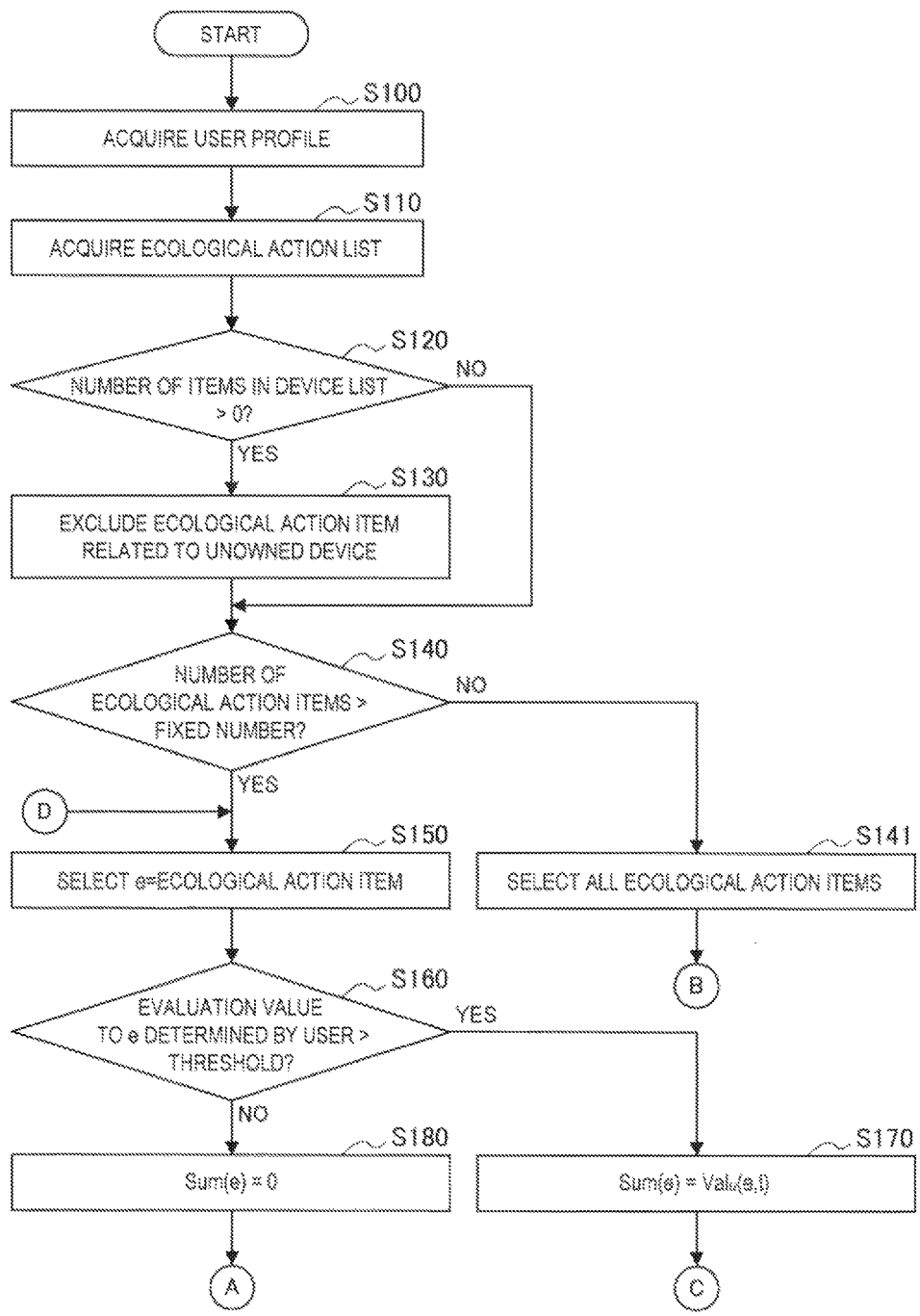
FIG. 29A is a flowchart showing the procedure of processing performed by the information processing system.
Figure 29B:
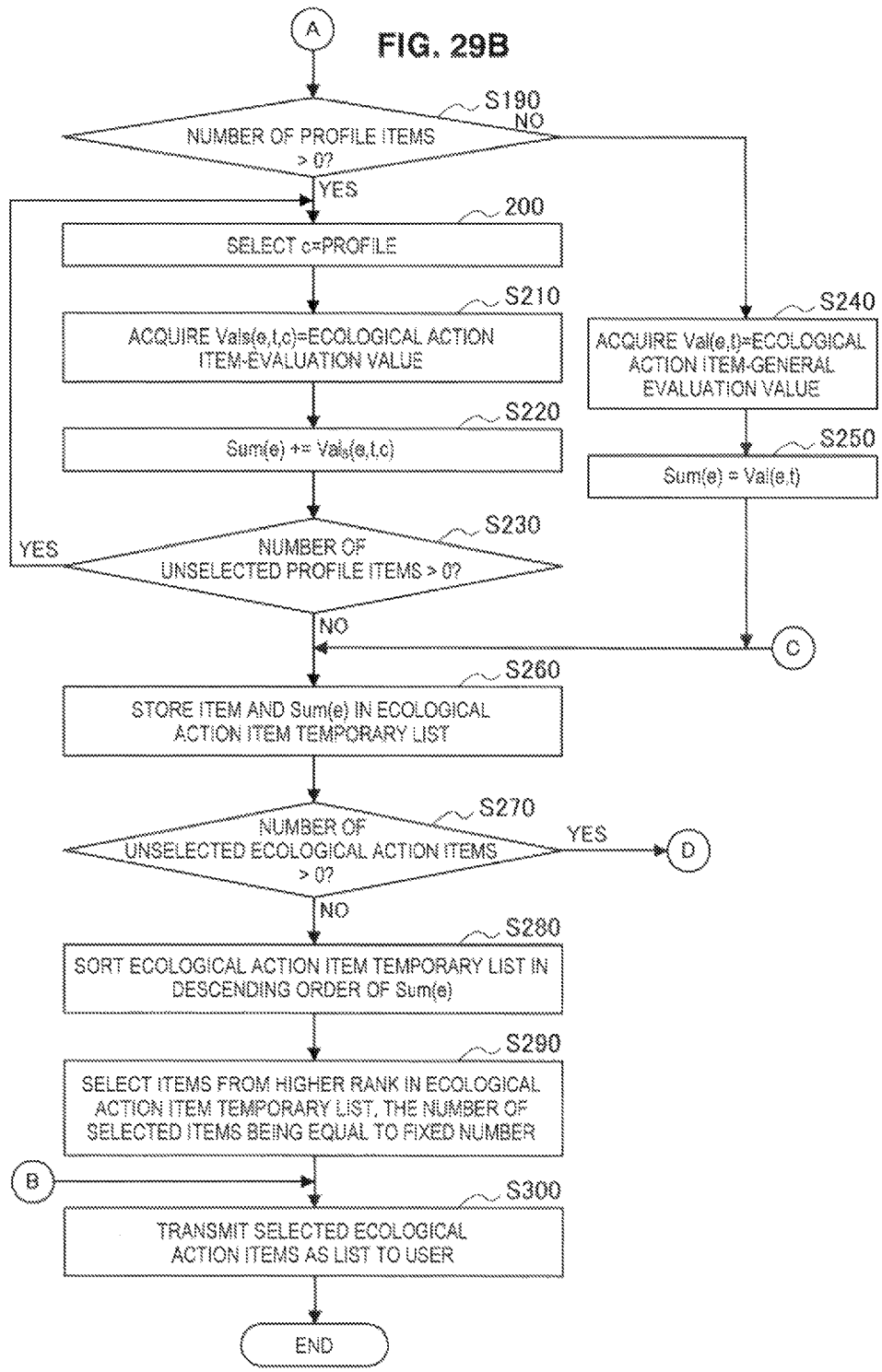
FIG. 29B is a flowchart showing the procedure of processing performed by the information processing system.

As shown in FIG. 26, the evaluation value table records an evaluation value ID, evaluation value information, and a key to the profile category link table, in association with one another. The evaluation value ID is identification information for uniquely identifying an evaluation value, and the evaluation value information indicates the evaluation value. The key to the profile category link table is a key for associating the evaluation value table with the profile category link table, and substantially indicates any one of ecological actions within the profile category link table. In this way, the category value, the ecological action, and the evaluation value are associated with one another.

Of the above-mentioned user report-related table group, the values in the following tables are set in advance, excluding the value of the key to the profile category link table: the device type table, the ecological action table, the profile category table, the user profile type table, and the device link table.

FIG. 27 shows an example of an ecological action statistics table. The ecological action statistics table represents statistics of all users registered in the server 30 regarding ecological effects of ecological actions. The ecological action statistics table classifies the ecological effect of each ecological action into "maximum", "minimum", and "average". In addition, the ecological action statistics table records "start time", "end time", and "reduction" for each classification of ecological effect.

The term "start time" means the time at which an ecological action is started, and the term "end time" means the time at which an ecological action is terminated. The term "reduction" means the reduction in actual power consumption per unit time. Here, the reduction in actual power consumption represents a value obtained by subtracting a value obtained by adding up individual actual power consumptions of devices related to the ecological action from a value obtained by adding up individual estimated power consumptions of devices related to the ecological action. In order to calculate the reduction in actual power consumption per unit time, the total of reduction in actual power consumption within a certain time period may be divided by the time period. The value of "reduction" in the "maximum" column represents a maximum value among reductions of all users, and "start time" and "end time" in the "maximum" column represent the start time and the end time corresponding to the maximum value, respectively. The value of "reduction" in the "minimum" column represents a minimum value among reductions of all users, and "start time" and "end time" in the "minimum" column represent the start time and the end time corresponding to the minimum value, respectively. The value of "reduction" in the "average" column represents an arithmetic average value of reductions of all users, and "start time" and "end time" in the "average" column represent an arithmetic average value of start times of all users and an arithmetic average value of end times of all users, respectively. Here, in the case of comparing reductions of all users with each other, the server 30 normalizes each reduction. This is because, since the living environments (family structure, size of living space, and the like) differ from user to user, it is difficult for the server 30 to perform an accurate comparison if reductions themselves are simply compared with each other. The normalization is performed as described below, for example. That is, the server 30 calculates total power consumption per day per user, for each of all users. Next, the server 30 calculates an arithmetic average value of those values. After that, the server 30 divides the arithmetic average value by the total power consumption of each user, and sets the value obtained in this way as a normalization coefficient for each user. Then, the server 30 multiplies the reduction of each user by the normalization coefficient, and thereby normalizing the reduction of each user.

The storage device 40 stores, in addition to the above-mentioned tables, the user action time line information reported by the user, an initial value of the ecological action list, and the like.

[2-3. Configuration of Server]

Next, based on FIG. 4, a configuration of the server 30 will be described. The server 30 includes a communication section 31, a control section 32, and a storage section 33. The communication section 31 communicates with the user device 20. The communication section 31 outputs the information obtained therefrom to the control section 32. The control section 32 includes a user report management section 321, an estimated power consumption calculation section 322, an ecological action evaluation section 323, and an ecological action suggestion section 324. The user report management section 321 stores information such as the ecological action reported by the user in the above-mentioned user report-related table group. The estimated power consumption calculation section 322 calculates individual estimated power consumption based on information stored in the user report-related table group and the link table. The ecological action evaluation section 323 calculates an evaluation value with respect to an ecological action performed by the user, based on information stored in the user report-related table group. The ecological action suggestion section 324 determines an ecological action to be presented to the user, based on information stored in the user report-related table group. The storage section 33 stores various types of information necessary for processing performed by the server 30, such as a program.

<3. Processing Performed by Information Processing System>

Next, a procedure of processing performed by the information processing system 10 will be described based on FIGS. 28 to 31. Note that a case where a user u acquires an ecological action list or the like will be used as an example in the description below. First, the user u performs registration in the server 30 in advance. For example, the user u enters, by using the input section 23, registration request information including name information of the user u. The user device 20 transmits a registration request signal including the registration request information to the server 30. When receiving the registration request signal, the server 30 determines a user ID, and transmits a user ID notification signal relative to the user ID to the user device 20. In addition, the server 30 stores the user ID, the name information, and the registration date/time information in the storage section 33. The user device 20 receives the user ID notification signal, and while displaying the user ID included therein on the presentation section 25, the user device 20 stores the user ID in the storage section 24. After that, the information processing system 10 performs the following processing.

In Step S10, the control section 26 displays the user information-reporting interface shown in FIG. 5 on the presentation section 25. The user u enters the user ID using the user information-reporting interface. In addition, the user u uses the user information-reporting interface and enters or selects a user profile. Specifically, the user u touches any one of entry fields, each of the entry fields being for each category of the user profile, thereby selecting a category. After that, the user u enters a category value into the selected category using the onscreen keyboard or selects a category value from the pull-down menu P16.

In this way, the entry fields are classified roughly into entry fields which allow the user u to directly enter a category value and entry fields which display multiple category values in the pull-down menu P16 and allowing the user u to select any one of category values from among those category values. Here, in the pull-down menu P16, the category values (that is, the category values stored in the profile category table) which are stored in the storage device 40 are displayed as they are. Therefore, the category value selected by the user u corresponds to the category value stored in the storage device 40. However, the category value directly entered by the user u may not necessarily correspond to the category value stored in the storage device 40. For example, in the case where the storage device 40 stores therein the information of "10's" and "20's" as the category values for the "age" category, the information of "35", which the user u enters for the "age" category, does not correspond to the category value stored in the storage device 40. Accordingly, the control section 26 converts the category value directly entered by the user u into a category value which is the nearest, among the category values stored in the storage device 40, to the category value directly entered by the user u. For example, "35" is converted into "30's".

In addition, the user u places the device icon P23 on the floor plan map P22, and thus, creates the device map P20. The control section 26 creates user profile registration information relative to the user profile entered by the user u and the device map P20, and outputs the user profile registration information to the communication section 21. The communication section 21 generates a user profile registration signal including the user profile registration information, and transmits the user profile registration signal to the server 30.

The communication section 31 of the server 30 receives the user profile registration signal, and the user profile registration information included in the signal is stored in the storage section 33.

Next, in Step S20, the control section 26 of the user device 20 displays the user action-reporting interface shown in FIG. 6. The user u uses the user action-reporting interface and enters user action time line information. The user action time line information includes information regarding the following: a report date which is the date on which a user action is performed; contents of each user action; action location of each user action; and start time and end time of each user action. On the other hand, the control section 26 generates an individual actual power consumption graph on the report date for each device, based on power consumption information given by the sensor 22, and stores the individual actual power consumption graph in the storage section 24. Note that, ecological actions classified into "ecological" are set to initial values, that is, all ecological actions stored in the server 30, before the user u reports the user action to the server 30, and the ecological actions are set to ecological actions that can be continuously carried out by the user u after the report.

After that, when the user u touches the report button P56, the control section 26 displays the degree-of-achievement-reporting interface shown in FIG. 5. The user u enters a check mark in the check box of the ecological action that is actually carried out among the ecological actions listed in the degree-of-achievement-reporting interface, and enters the degree of achievement thereof. The user u touches the report button P94 when the entry is completed. Note that, ecological actions listed in the degree-of-achievement-reporting interface are set to initial values, that is, all ecological actions stored in the server 30, before the user u reports the user action to the server 30, and the ecological actions are set to ecological actions that can be continuously carried out by the user u after the report.

Next, the control section 26 generates user action report information including the user action time line information, the individual actual power consumption graph, and degree-of-achievement information of each ecological action, and outputs the user action report information to the communication section 21. The communication section 21 generates a user action report signal including the user action report information, and transmits the user action report signal to the server 30.

The communication section 31 receives the user action report signal, and stores the user action report information included in the signal in the storage section 33. The user report management section 321 newly generates the user report-related table group shown in FIG. 15, and stores information stored in the storage section 33 in the tables.

Specifically, the user report management section 321 stores, in the user table, a user ID, name information, registration date/time information, and report date information.

Further, the user report management section 321 stores, in the device table, a device ID, model number information, an individual actual power consumption graph, connection recognition date/time information, report date information, installation location information, a key to the user table, a key to the device type table, and a key to the device link table. The number of the device tables to be generated is the same as the number of the device icons P23 included in the device map P20.

Further, the user report management section 321 stores, in the user report table, a report action item ID, report date information, degree-of-achievement information, start time information, end time information, action location information, a key to the user table, a key to the ecological action table, and a key to the evaluation value table.

Further, the user report management section 321 stores, in the user profile table, a user profile-set value ID, a key to the user table, and a key to the profile category table.

Further, the user report management section 321 stores, in the profile category link table, all category values reported by the user and all ecological actions reported by the user in association with each other. That is, each category value is associated with all ecological actions. In accordance therewith, the user report management section 321 changes the key to the profile category link table.

Next, the estimated power consumption calculation section 322 calculates an individual estimated power consumption graph for each user report table, that is, for each ecological action reported by the user u. Specifically, first, the estimated power consumption calculation section 322 identifies, based on the user report table, an ecological action and an operation time period (i.e., time period from start time to end time) in which the ecological action is executed. Next, the estimated power consumption calculation section 322 extracts, based on the user action time line information reported by the user u in the past, user action time line information in which the ecological action is not performed during the operation time period (hereinafter, also referred to as "non-operation time line information"). On the other hand, the estimated power consumption calculation section 322 identifies, based on the link table, a device related to the ecological action, that is, a related device. Subsequently, the estimated power consumption calculation section 322 extracts, out of the individual actual power consumption graphs of the same report date as the report date of the extracted user action time line information, an individual actual power consumption graph related to the related device as the individual estimated power consumption graph. Next, the estimated power consumption calculation section 322 stores the extracted individual estimated power consumption graph in the user report table. In the case where there a multiple individual estimated power consumption graphs with respect to one user report table, the estimated power consumption calculation section 322 stores all of the multiple individual estimated power consumption graphs in the user report table.

Note that, in the case where there is no non-operation time line information, the estimated power consumption calculation section 322 identifies a user (hereinafter, also referred to as "alternative user") who has at least the related device among the other users. Next, the estimated power consumption calculation section 322 performs the same processing as described above, based on information reported by the alternative user. In this way, the estimated power consumption calculation section 322 extracts the individual actual power consumption graph related to the related device from individual actual power consumption graphs reported by the alternative user. Subsequently, the estimated power consumption calculation section 322 multiplies the extracted individual actual power consumption graph by a predetermined alternative coefficient, and thus, calculates an individual estimated power consumption graph. Note that the alternative coefficient is obtained by dividing total actual power consumption of the user upper day by total actual power consumption of the alternative user per day. It is preferred that the alternative user not only have the related device, but also have a living environment similar to the user u (for example, the alternative user and the user u have a common floor plan of a house and a common family structure).

In addition, the user report management section 321 generates the ecological action statistics table shown in FIG. 27, based on the user report-related table group of all users. The method of calculating "reduction" is as described above. Further, the user report management section 321 creates a user action pie chart based on the user action time line information.

In addition, the ecological action evaluation section 323 calculates, in accordance with the flowchart shown in FIG. 31, an individual evaluation value $Val_u(e,t)$, a category-based evaluation value $Val_s(e,t,c)$, and a general evaluation value $Val(e,t)$, for each ecological action reported by the user u.

In Step S390, the ecological action evaluation section 323 acquires the user report table of the user u. In Step S400, the ecological action evaluation section 323 determines whether the number of the user report tables is larger than 0, and in the case of determining that it is larger than 0, proceeds to Step S410, and in the case of determining that it is 0, terminates the processing.

In Step S410, the ecological action evaluation section 323 acquires any one of ecological actions (i.e., user report tables), e, reported by the user. In Step S420, the ecological action evaluation section 323 calculates an individual evaluation value $Val_u(e,t)$, and a general evaluation value $Val(e,t)$ with respect to the ecological action e, based on the following Equations (1) to (6).

In Step S430, the ecological action evaluation section 323 determines whether the number of user profile tables reported by the user u (i.e., number of category values) is larger than 0, and in the case of determining that it is larger than 0, proceeds to Step S440, and in the case of determining that it is 0, proceeds to Step S470.

In Step S440, the ecological action evaluation section 323 acquires one of the category values. In Step S450, the ecological action evaluation section 323 calculates a category-based evaluation value $Val(e,t,c)$ with respect to the ecological action e, based on the following Equations (7) to (9).

$$Val(e,t) = Val_e \times Ach(e,t) \times Exe(e,t) \quad (1)$$

$$Ach(e,t) = (\Sigma_{t'=1}^{t}[\Sigma_{u'=1}^{Y_e,t'Rep_{t'}}\{Ascore_{e,t',u'}\}/(Y_{e,t'}Rep_{t'})])/t \quad (2)$$

$$Exe(e,t) = (\Sigma_{t'=1}^{t}Y_{e,t'})/t \quad (3)$$

$$Val_u(e,t) = Val_e \times Ach_u(e,t) \times Exe_u(e,t) \quad (4)$$

$$Ach_u(e,t) = (\Sigma_{t'=1}^{t}Ascore_{e,t',u})/t \quad (5)$$

$$Exe_u(e,t) = (\Sigma_{t'=1}^{t}Y_{e,t',u})/t \quad (6)$$

$$Val_s(e,t,c) = Val_e \times Ach_s(e,t,c) \times Exe_s(e,t,c) \quad (7)$$

$$Ach_s(e,t,c) = (\Sigma_{t'=1}^{t}[\Sigma_{u'=1}^{Y_cY_{e,t'}Rep_{t'}}\{Ascore_{e,t',u',c}\}/(Y_cY_{e,t'}Rep_{t'})])/t \quad (8)$$

$$Exe_s(e,t,c) = (\Sigma_{t'=1}^{t}Y_{e,t'} \cdot Y_c)/t \quad (9)$$

$Val_u(e,t)$: Evaluation value of ecological action e with respect to user u $Val_e$: Initial value of evaluation value, this value is set in accordance with degree of ecological effect.

With increase in degree of ecological effect, initial value increases.

$Ascore_{e,t',u'}$: Degree of achievement of ecological action e reported by user u on t'-th day $Y_{e,t',u'}$: 1/number of all users $Rep_{t'}$: Number of users who report user action (i.e., who perform processing of Step S20) on t'-th day $Y_c$: Percentage of users having category value c, out of all users $Y_{e,t'}$: Percentage of users executing ecological action e on t'-th day, out of all users $Ascore_{e,t',u',c}$: Degree of achievement of ecological action e reported by user u' having category value c on t'-th day $Ascore_{e,t',u'}$: Degree of achievement of ecological action e reported by user u' on t'-th day Note that, here, the report date that is (t−1) day(s) before the latest report date of the user u is represented by 1st day, and after that, report dates are represented by 2nd day, 3rd day, . . . , t-th day (the latest report date), respectively. Further, the ecological action evaluation section 323 calculates the category-based evaluation value $Val(e,t,c)$ with respect to the ecological action e, for all category values reported by the user u. The ecological action evaluation section 323 generates an evaluation value table, and stores, in the evaluation value table, an evaluation value ID, evaluation values (an individual evaluation value, a category-based evaluation value, and a general evaluation value), and a key to the profile category link table. Here, the category-based evaluation value $Val(e,t,c)$ stored in the evaluation value table corresponds to a combination of the ecological action and the category value indicated by the key to the profile category link table. That is, the number of the evaluation value tables for the ecological action e to be created is the same as the number of category values reported by the user.

In Step S460, the ecological action evaluation section 323 determines whether there is an unselected category value, and in the case of determining that there is an unselected category value, returns to Step S440, and in the case of determining that there is no unselected category value, proceeds to Step S470.

In Step S470, the ecological action evaluation section 323 determines whether there is an unselected ecological action, and in the case of determining that there is an unselected ecological action, returns to Step S410, and in the case of determining that there is no unselected ecological action, terminates the processing.

Next, in Step S30, the ecological action suggestion section 324 provides the user u with the ecological action list and the like. Specifically, the processing shown in FIGS. 29A to 31 is performed. That is, in Step S100, the ecological action suggestion section 324 acquires the latest user report-related table group of the user u.

After that, in Step S110, the ecological action suggestion section 324 acquires an initial value of the ecological action list from the storage device 40. As the initial values in the ecological action list, various ecological actions are listed. The ecological action suggestion section 324 filters the initial values based on the user report-related table group.

In Step S120, the ecological action suggestion section 324 determines whether the number of device tables is larger than 0, and in the case of determining that it is larger than 0, proceeds to Step S130, and in the case of determining that it is 0, proceeds to Step S140.

In Step S130, the ecological action suggestion section 324 excludes an ecological action related to the device that is not owned by the user from the initial values of the ecological action list, based on the device table and the device link table.

In Step S140, the ecological action suggestion section 324 determines whether the number of ecological actions listed in the ecological action list is larger than a fixed number (for example, 10), and in the case where it is larger, the ecological action suggestion section 324 proceeds to Step S150, and in the case where the number of ecological actions listed in the ecological action list is equal to or less than the fixed number, the ecological action suggestion section 324 proceeds to Step S141.

In Step S141, the ecological action suggestion section 324 selects all ecological actions listed in the ecological action list, and proceeds to Step S300.

In Step S150, the ecological action suggestion section 324 selects any one of the user report tables. In Step S160, the ecological action suggestion section 324 acquires an individual evaluation value $Val_u(e,t)$ based on the key to the evaluation value table stored in the user report table, and determines whether the individual evaluation value is larger than a predetermined threshold. In the case of determining that the individual evaluation value $Val_u(e,t)$ is larger than the threshold, the ecological action suggestion section 324 proceeds to Step S170, and in the case of determining that the individual evaluation value $Val_u(e,t)$ is equal to or less than the threshold, the ecological action suggestion section 324 proceeds to Step S180.

In Step S170, the ecological action suggestion section 324 defines an ecological action evaluation standard value Sum(e) corresponding to the ecological action selected in Step S150, and sets the value as the individual evaluation value $Val_u(e,t)$. After that, the ecological action suggestion section 324 proceeds to Step S260.

In Step S180, the ecological action suggestion section 324 defines the ecological action evaluation standard value Sum(e) corresponding to the ecological action selected in Step S150, and sets the ecological action evaluation standard value Sum(e) to 0. In Step S190, the ecological action suggestion section 324 determines whether the number of user profile tables is larger than 0, and in the case of determining that it is larger than 0, proceeds to Step S200, and in the case of determining that the number of user profile tables is 0, proceeds to Step S240.

In Step S200, the ecological action suggestion section 324 selects any one of the user profile tables, that is, any one of category values. In Step S210, the ecological action suggestion section 324 acquires the category-based evaluation value Val(e,t,c) corresponding to the combination of the ecological action selected in Step S150 and the category value selected in Step S200, based on the key to the profile category link table stored in the evaluation value table. Then, in Step S220, the ecological action suggestion section 324 adds the category-based evaluation value Val(e,t,c) to the ecological action evaluation standard value Sum(e).

In Step S230, the ecological action suggestion section 324 determines whether there is an unselected category value, and in the case of determining that there is an unselected category value, returns to Step S200, and in the case of determining that there is no unselected category value, proceeds to Step S260. Accordingly, the ecological action suggestion section 324 repeats the processing of Step S200 to Step S230, and thus, calculates the ecological action evaluation standard value Sum(e).

In Step S240, the ecological action suggestion section 324 acquires the general evaluation value Val(e,t) corresponding to the ecological action selected in Step S150, based on the key to the evaluation value table. In Step S250, the ecological action suggestion section 324 sets the general evaluation value Val(e,t) as the ecological action evaluation standard value Sum(e). In Step S260, the ecological action suggestion section 324 temporarily stores the ecological action evaluation standard value Sum(e) in the storage section 33.

In Step S270, the ecological action suggestion section 324 determines whether there is an unselected ecological action, and in the case of determining that there is an unselected ecological action, returns to Step S150, and in the case of determining that there is no unselected ecological action, proceeds to Step S280. Accordingly, the ecological action suggestion section 324 repeats the processing of Step S150 to Step S270, and thus, calculates the ecological action evaluation standard value Sum(e) for each ecological action listed in the ecological action list.

In Step S280, the ecological action suggestion section 324 sorts the ecological actions listed in the ecological action list in descending order of the ecological action evaluation standard value Sum(e). In Step S290, the ecological action suggestion section 324 selects ecological actions from the higher rank, the number of selected ecological actions being equal to a fixed number.

In Step S300, the ecological action suggestion section 324 generates an ecological action list in which the selected ecological actions are listed, and outputs the ecological action list to the communication section 31. The communication section 31 generates an ecological action list signal including the ecological action list, and transmits the ecological action list signal to the user device 20. The user device 20 stores the ecological action list included in the ecological action list signal in the storage section 24. In this way, the ecological action list of the user device 20 is updated. The ecological action list which is updated as described above shows the ecological actions selected in descending order of evaluation value, and hence, the user can grasp a continuously practicable ecological action more easily than in the past.

Next, based on FIG. 32, an example of presenting an ecological action list to users A to C will be described. In Step S10, the users A and C each select "category value 1" for "category I", and the user B selects "category value 2" for "category I". In Step S20, the users A to C each report a user action. In Step S420, there are calculated an individual evaluation value $Val_A(e,t)$ of the user A, an individual evaluation value $Val_B(e,t)$ of the user B, and an individual evaluation value $Val_C(e,t)$ of the user C.

Next, in Step S450, based on the user actions reported by the users A and C, a category-based evaluation value $Val_s(e, t, c1)$ is calculated. In the same manner, based on the user action reported by the user B, a category-based evaluation value $Val_s(e, t, c2)$ is calculated.

Next, in Step S420, a general evaluation value Val(e,t) is calculated. After that, with respect to the user A, in Step S260, ecological actions are sorted in descending order based on the individual evaluation value $Val_A(e,t)$, the category-based evaluation value $Val_s(e,t,c1)$, and the general evaluation value Val(e,t). Then, in Steps S280 to S300, the ecological action corresponding to the superior evaluation value is provided to the user A.

In the same manner, with respect to the user B, in Step S260, ecological actions are sorted in descending order based on the individual evaluation value $Val_B(e,t)$, the category-based evaluation value $Val_s(e,t,c2)$, and the general evaluation value Val(e,t). Then, in Steps S280 to S300, the ecological action corresponding to the superior evaluation value is provided to the user B.

In the same manner, with respect to the user C, in Step S260, ecological actions are sorted in descending order based on the individual evaluation value $Val_C(e,t)$, the category-based evaluation value $Val_s(e,t,c1)$, and the general evaluation value Val(e,t). Then, in Steps S280 to S300, the ecological action corresponding to the superior evaluation value is provided to the user C.

In Step S310 shown in FIG. 30, the ecological action suggestion section 324 acquires the user report table. In Step S320, the ecological action suggestion section 324 defines the ecological action evaluation value Sum, and sets the value to 0.

In Step S330, the ecological action suggestion section 324 determines whether the number of user report tables is larger than 0. As a result, in the case where the number of user report tables is larger than 0, the ecological action suggestion section 324 proceeds to Step S340, and in the case where it is 0, proceeds to Step S380.

In Step S340, the ecological action suggestion section 324 selects any one of the user report tables, that is, any one of the ecological actions. In Step S350, the ecological action suggestion section 324 acquires the individual evaluation value $Val_u(e,t)$ corresponding to the ecological action. In Step S360, the ecological action suggestion section 324 adds the individual evaluation value $Val_u(e,t)$ to the ecological action evaluation value Sum.

In Step S370, the ecological action suggestion section 324 determines whether there is an unselected ecological action, and in the case of determining that there is an unselected ecological action, returns to Step S340, and in the case of determining that there is no unselected ecological action, proceeds to Step S380.

In Step S380, the ecological action suggestion section 324 generates ecological action evaluation value information regarding the ecological action evaluation value Sum, and outputs the ecological action evaluation value information to the communication section 31. The communication section 31 generates an ecological action evaluation value signal including the ecological action evaluation value information, and transmits the ecological action evaluation value signal to the user device 20. The control section 26 generates the cartoon character image P150 based on the information included in the ecological action evaluation value signal, and presents the cartoon character image P150 on the presentation section 25.

In addition, the ecological action suggestion section 324 outputs user report table information stored in the user report table to the communication section 31. The communication section 31 generates a user report table signal including the user report table information, and transmits the user report table signal to the user device 20. The control section 26 stores, in the storage section 24, the user report table information included in the user report table signal. Then, first, the user device 20 displays the user action evaluation image shown in FIG. 9, and then in the case where the user u selects any one of the ecological actions, the user device 20 displays the enlarged evaluation image shown in FIG. 10. In this case, the control section 26 displays an individual estimated power consumption graph based on the user report table information stored in the storage section 24.

In addition, the ecological action suggestion section 324 determines, based on the user action time line information accumulated for the user u, whether there is a user action (hereinafter, also referred to as "regular user action") which is performed regularly by the user u and which belongs to "home appliances". Here, whether it is performed regularly is determined on the basis that the user action is performed a predetermined number of times (for example, three times) per day, or the user action is performed in the same time period every day, for example. Further, since the user action belonging to "home appliances" is an action that uses a device, the individual actual power consumption corresponding to the device is larger than the individual estimated power consumption (=0).

Next, in the case where there is the regular user action, the ecological action suggestion section 324 determines whether the percentage of the regular user action performed during a single day is large compared with another user. For this determination, user action pie charts of all users are used. That is, the ecological action suggestion section 324 calculates an average of the percentages of the regular user action based on the user action pie charts of all users. In the case where the percentage of the regular user action performed by the user u exceeds the average, the ecological action suggestion section 324 determines that the percentage of the regular user action is large compared with the other user. In the case of determining in this way, first, the ecological action suggestion section 324 calculates actual power consumption owing to the regular user action, based on the individual actual power consumption graph for the device.

In addition, the ecological action suggestion section 324 searches for, based on the user report-related table groups of all users, an alternative ecological action, that is, an ecological action in which the total of the individual estimated power consumption related to the ecological action is larger than the total of the individual actual power consumption of the ecological action, and which does not collide with the regular user action. The ecological action suggestion section 324 outputs alternative ecological action information related to the retrieved alternative ecological action and the regular user action to the communication section 31. The communication section 31 generates an alternative ecological action signal including the alternative ecological action information, and transmits the alternative ecological action signal to the user device 20. The user device 20 presents the regular user action and the alternative ecological action, based on the alternative ecological action information. For example, the user device 20 presents the following information: "You are using the hair dryer for 1 minute longer than ordinary people. This is equivalent to the power consumption that can be reduced by lowering the temperature of shower water by 1° C." That is, the user device 20 presents the alternative ecological action of "lowering the temperature of shower water by 1° C.". In the same manner, in the case where the TV power consumption of the user is larger than TV power consumption of other users, the presentation section 25 presents the following information: "You are using the TV for 1 hour longer than ordinary people. This is equivalent to the power consumption that can be reduced by spending a single day in a state in which the air conditioner (cooling) is set 3° C. higher than now." That is, the user device 20 presents the alternative ecological action of "raising the temperature setting of the air conditioner by 3° C.".

In addition, the ecological action suggestion section 324 outputs the information stored in the ecological action statistics table shown in FIG. 27, that is, ecological action statistics information, to the communication section 31. The communication section 31 generates an ecological action statistics signal including the ecological action statistics information and outputs the ecological action statistics signal to the user device 20. The user device 20 presents the ecological action statistics information included in the ecological action statistics signal. In this way, the time at which reduction of actual power consumption becomes the maximum is presented for each ecological action. For example, the following information is presented: "No ecological effect can be expected in this reported time period. Open curtain after 9:30." Further, the time at which the reduction becomes the minimum and the average time are displayed in response to the request of the user u.

As described above, according to the information processing system 10, the presentation section 25 presents the individual actual power consumption and the individual estimated power consumption in association with each other, and thus, the user can determine whether each user action has ecological effects more easily than in the past. Further, the user can grasp ecological effects of each ecological action more easily than in the past.

Further, since the presentation section 25 presents the time at which the difference between the actual power consumption and the estimated power consumption becomes the maximum, the user can easily improve the ecological action.

Still further, in the case where the user action is regularly performed by the user and the individual actual power consumption of the device is larger than the individual estimated power consumption, the presentation section 25 presents an alternative ecological action, and hence, the user can perform the ecological action without disturbing the lifestyle of the user.

Still further, in the case where the user does not recognize a user action in which the individual actual power consumption is larger than the individual estimated power consumption and which the user supports, the presentation section 25 presents the user action, and hence, the user can easily grasp the user action which the user has not been aware of.

Still further, since the information processing system 10 calculates the individual estimated power consumption based on the user report-related table groups of other users, the individual estimated power consumption can be reliably calculated.

Still further, the information processing system 10 selects, based on the state of the user, to be specific, based on information stored in the user report-related table group, an ecological action that can be continuously carried out by the user from among multiple ecological actions, and presents the selected ecological action to the user. Accordingly, the user can easily determine what is there, as the continuously practicable ecological action.

Still further, the information processing system 10 calculates the evaluation value for each of the multiple ecological actions based on the information stored in the user report-related table group, and selects an ecological action that can be carried out by the user based on the calculated evaluation values, and therefore, the ecological action that can be continuously carried out by the user can be selected more reliably.

Still further, the information processing system 10 calculates the evaluation value based on the information stored in the user report-related table group, in particular, information (degree-of-achievement information and the like) stored in the user report table, and therefore, the ecological action that can be continuously carried out by the user can be selected more reliably.

Still further, the information processing system 10 calculates the evaluation value using not only the user report table of a user, but also a user report table of another user who has a user profile (specifically, any one of the category values) common to the user, and therefore, the ecological action that can be continuously carried out by the user can be selected more reliably.

Still further, the information processing system 10 excludes an ecological action related to the device that is not owned by the user from the multiple ecological actions, and selects the ecological action that can be carried out by the user from the remaining ecological actions, and therefore, the ecological action that can be continuously carried out by the user can be selected more reliably.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An information processing apparatus including
   a control section which performs control of presenting, in association with each other, actual energy consumption representing an amount of energy consumed by a device in a case where a user performs any one of user actions, the user actions each being capable of being carried out by the user, and estimated energy consumption representing an amount of energy consumed by the device in a case where the user does not perform the user action.

(2) The information processing apparatus according to (1),
   wherein the control section performs control of presenting time at which a difference between the actual energy consumption and the estimated energy consumption becomes a maximum.

(3) The information processing apparatus according to (1) or (2),
   wherein, in a case where the user action is regularly performed by the user and the actual energy consumption is larger than the estimated energy consumption, the control section performs control of presenting another user action in which the estimated energy consumption is larger than the actual energy consumption.

(4) The information processing apparatus according to any one of (1) to (3),
   wherein, in a case where the actual energy consumption is larger than the estimated energy consumption and the user does not recognize the user action, the control section performs control of presenting the user action.

(5) The information processing apparatus according to any one of (1) to (4),
   wherein the estimated energy consumption is calculated based on actual energy consumption of the device when another user does not perform the user action.

(6) An information processing method including
   performing control of presenting, in association with each other, actual energy consumption representing an amount of energy consumed by a device in a case where a user performs any one of user actions, the user actions each being capable of being carried out by the user, and estimated energy consumption representing an amount of energy consumed by the device in a case where the user does not perform the user action.

(7) A program for causing a computer to realize a control function for performing control of presenting, in association with each other, actual energy consumption representing an amount of energy consumed by a device in a case where a user performs any one of user actions, the user actions each being capable of being carried out by the user, and estimated energy consumption representing an amount of energy consumed by the device in a case where the user does not perform the user action.

(8) An information processing apparatus including a control section which performs control of selecting, based on a state of a user, an ecological action capable of being carried out by the user from among a plurality of ecological actions, and of presenting the selected ecological action to the user.

(9) The information processing apparatus according to (8), wherein the control section calculates an evaluation value for each of the plurality of ecological actions based on the state of the user, and selects an ecological action capable of being carried out by the user based on the calculated evaluation value.

(10) The information processing apparatus according to (9), wherein the state of the user includes an operation state representing a state in which the user carries out each of the plurality of ecological actions, and wherein the control section calculates the evaluation value based on the operation state.

(11) The information processing apparatus according to any one of (8) to (10), wherein the control section calculates the evaluation value, based on a first operation state representing a state in which the user carries out each of the plurality of ecological actions and on a second operation state representing a state in which another user, who has a user profile common to the user, carries out each of the plurality of ecological actions.

(12) The information processing apparatus according to any one of (8) to (11), wherein the control section excludes an ecological action related to a device that is not owned by the user from the plurality of ecological actions, and selects an ecological action capable of being carried out by the user from remaining ecological actions.

(13) An information processing method including performing control of selecting, based on a state of a user, an ecological action capable of being carried out by the user from among a plurality of ecological actions, and of presenting the selected ecological action to the user.

(14) A program for causing a computer to realize a control function for performing control of selecting, based on a state of a user, an ecological action capable of being carried out by the user from among a plurality of ecological actions, and of presenting the selected ecological action to the user.

The present disclosure contains subject matter related to that disclosed in Japanese Priority Patent Application JP 2011-103480 filed in the Japan Patent Office on May 6, 2011, the entire content of which is hereby incorporated by reference.

What is claimed is:

1. An information processing apparatus comprising:
at least one processor;
a control section which performs, using the at least one processor, control of presenting, in association with each other, actual energy consumption representing an amount of energy consumed by a separate utility device in a case where a user performs any one of a plurality of ecological user actions, the plurality of ecological user actions each capable of being carried out by the user, and estimated energy consumption representing an amount of energy consumed by the separate utility device in a case where the user does not perform at least one of the plurality of ecological user actions,
wherein the control section performs control of presenting an indication to the user to notify of a time when a difference between the actual energy consumption and the estimated energy consumption becomes maximum.

2. The information processing apparatus according to claim 1,
wherein, in a case where a first user action of the plurality of ecological user actions is regularly performed by the user and an actual energy consumption is larger than the estimated energy consumption, the control section performs control of presenting a second user action of the plurality of ecological user actions in which the estimated energy consumption is larger than the actual energy consumption.

3. The information processing apparatus according to claim 1,
wherein, in a case where the actual energy consumption is larger than the estimated energy consumption and the user does not recognize at least one of the plurality of ecological user actions, the control section performs control of presenting the plurality of ecological user actions.

4. The information processing apparatus according to claim 1,
wherein the estimated energy consumption is calculated based on actual energy consumption of the separate utility device when another user does not perform the plurality of ecological user actions.

5. An information processing method comprising
performing control of presenting, in association with each other, actual energy consumption representing an amount of energy consumed by a separate utility device in a case where a user performs any one of a plurality of ecological user actions, the ecological user actions each being capable of being carried out by the user, and estimated energy consumption representing an amount of energy consumed by the separate utility device in a case where the user does not perform at least one of the plurality of ecological user actions; and
performing control of presenting an indication to the user to notify of a time when a difference between the actual energy consumption and the estimated energy consumption becomes maximum.

6. A non-transitory computer-readable medium having embodied thereon a program, which when executed by at least one processor of a computer causes the at least one processor to realize
a control function for performing, using the at least one processor, control of presenting, in association with each other, actual energy consumption representing an amount of energy consumed by a separate utility device in a case where a user performs any one of a plurality of ecological user actions, the plurality of ecological user actions each being capable of being carried out by the user, and estimated energy consumption representing an amount of energy consumed by the separate utility device in a case where the user does not perform any of the plurality of ecological user actions; and a control function for performing control of presenting an indication to the user to notify of a time when a difference between the actual energy consumption and the estimated energy consumption becomes maximum.

7. The information processing apparatus according to claim 1, wherein the separate utility device comprises at least one of:
a hair dryer;
an air conditioner;
a personal computer;
a television;
a refrigerator;
a lighting device;
a washing machine;
a heating device;
a toilet seat device;
an electric vehicle; or
an electric bicycle.

8. The information processing apparatus according to claim 1, wherein the control section further performs control of presenting visual reward content.

* * * * *